(12) United States Patent
Choi

(10) Patent No.: US 10,645,168 B2
(45) Date of Patent: May 5, 2020

(54) ELECTRONIC DEVICE AND CONTROLLING METHOD THEREOF

(71) Applicant: Samsung Electronics Co., Ltd., Suwon-si, Gyeonggi-do (KR)

(72) Inventor: Pil Sik Choi, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 216 days.

(21) Appl. No.: 15/800,722

(22) Filed: Nov. 1, 2017

(65) Prior Publication Data

US 2018/0146042 A1 May 24, 2018

(30) Foreign Application Priority Data

Nov. 1, 2016 (KR) .................. 10-2016-0144536

(51) Int. Cl.
*H04L 29/08* (2006.01)
*H04L 12/28* (2006.01)
*G01S 5/06* (2006.01)
*G06F 3/16* (2006.01)
*G01S 5/02* (2010.01)
*G10L 15/22* (2006.01)
(Continued)

(52) U.S. Cl.
CPC ............ *H04L 67/12* (2013.01); *G01S 5/0252* (2013.01); *G01S 5/06* (2013.01); *G06F 3/167* (2013.01); *G10L 15/22* (2013.01); *G10L 15/265* (2013.01); *H04L 12/282* (2013.01); *G01S 5/0081* (2013.01); *G10L 2015/223* (2013.01); *H04L 67/18* (2013.01)

(58) Field of Classification Search
CPC ..... G01S 5/0252; G08C 17/02; G10L 15/265; G10L 15/22; G10L 2015/223; H04L 12/282; H04L 67/18; H04L 67/025; G06F 3/167

See application file for complete search history.

(56) References Cited

U.S. PATENT DOCUMENTS 7,139,716 B1 11/2006 Gaziz
7,363,028 B2 4/2008 De Clercq et al.
7,649,456 B2 1/2010 Wakefield et al.
(Continued)

OTHER PUBLICATIONS

European Office Action dated May 14, 2019, issued in a counterpart European application No. 17199587.1-1221.
(Continued)

*Primary Examiner* — Kyung H Shin
(74) *Attorney, Agent, or Firm* — Jefferson IP Law, LLP

(57) ABSTRACT

An electronic device is provided. The electronic device includes a memory, a transceiver that communicates with at least one external device, and at least one processor that is electrically connected with the memory and the communication module. The at least one processor is configured to receive an utterance place candidate group and a command for controlling a peripheral device associated with an utterance place from at least one or more other electronic devices by using the transceiver and to store the received utterance place candidate group and the received command in the memory, to select at least one utterance place based on the received utterance place candidate group, and to transmit, to a peripheral device associated with the selected utterance place, a command for controlling the peripheral device.

18 Claims, 14 Drawing Sheets

(51) Int. Cl.
*G10L 15/26* (2006.01)
*G01S 5/00* (2006.01)

(56) References Cited

U.S. PATENT DOCUMENTS

| | | |
|---|---|---|
| 7,843,333 B2 | 11/2010 | Angelhag et al. |
| 8,059,621 B2 | 11/2011 | De Clercq et al. |
| 8,180,373 B2 | 5/2012 | De Clercq et al. |
| 8,712,352 B2 | 4/2014 | De Clercq et al. |
| 8,825,020 B2 | 9/2014 | Mozer et al. |
| 8,942,726 B2 | 1/2015 | De Clercq et al. |
| 9,026,141 B2 | 5/2015 | De Clercq et al. |
| 9,363,644 B2 | 6/2016 | Jin et al. |
| 9,547,982 B2 | 1/2017 | De Clercq et al. |
| 9,613,526 B2 | 4/2017 | De Clercq et al. |
| 2005/0094610 A1 | 5/2005 | De Clercq et al. |
| 2008/0137631 A1 | 6/2008 | De Clercq et al. |
| 2008/0180228 A1* | 7/2008 | Wakefield ............ G01S 5/0252 340/4.62 |
| 2008/0181172 A1 | 7/2008 | Angelhag et al. |
| 2011/0102131 A1 | 5/2011 | De Clercq et al. |
| 2012/0146761 A1 | 6/2012 | De Clercq et al. |
| 2013/0183944 A1 | 7/2013 | Mozer et al. |
| 2014/0062678 A1 | 3/2014 | De Clercq et al. |
| 2014/0315573 A1 | 10/2014 | De Clercq et al. |
| 2015/0065119 A1 | 3/2015 | De Clercq et al. |
| 2015/0221214 A1 | 8/2015 | De Clercq et al. |
| 2016/0021511 A1 | 1/2016 | Jin et al. |
| 2016/0121229 A1 | 5/2016 | Guo |
| 2016/0125880 A1 | 5/2016 | Zhang et al. |
| 2016/0212582 A1 | 7/2016 | Jin et al. |

OTHER PUBLICATIONS

Hossain et al., "Utilization of user feedback in indoor positioning system", Pervasive and Mobile Computing, Elsevier, NL, vol. 6, No. 4, Aug. 1, 2010, pp. 467-481, XP027267794, ISSN: 1574-1192.

* cited by examiner

ELECTRONIC DEVICE AND CONTROLLING METHOD THEREOF

CROSS-REFERENCE TO RELATED APPLICATION(S)

This application claims the benefit under 35 U.S.C. § 119(a) of a Korean patent application filed on Nov. 1, 2016 in the Korean Intellectual Property Office and assigned Serial number 10-2016-0144536, the entire disclosure of which is hereby incorporated by reference.

TECHNICAL FIELD

The present disclosure relates to an electronic device for controlling a peripheral device. More particularly, the present disclosure relates to a method and apparatus for receiving an utterance place candidate group and a command for controlling a peripheral device associated with an utterance place, selecting at least one utterance place, and transmitting a command for controlling a peripheral device.

BACKGROUND

The internet interconnects computing devices such as personal computers (PCs), mobile devices, and the like, thus making it possible to exchange information between devices. Nowadays, there are attempts to exchange a variety of information or data through connection of things with no computing function, for example, sensors, home appliances, and meters, to the internet, as well as computing devices according to the related art. As such, the mechanism for connecting the things to the internet is collectively referred to as "internet of things (IoT)".

To implement an IoT environment, there is a need for establishment of a protocol for communication of various kinds of IoT devices, communication between other devices, data collection, etc.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for controlling internet of things (IoT) devices by using an IoT technology, a user needs to specify an IoT device and direct a control. For example, when the user controls an IoT device by voice, there is a need to utter exactly such that an IoT device existing at a specific location is specified.

Accordingly, whenever the user controls a specific IoT device existing at a specific location, the user needs to distinguish the specific location from other locations. However, such a restraint may hinder user experience with regard to the IoT.

In accordance with an aspect of the present disclosure, an electronic device is provided. The electronic device includes a memory, a transceiver (e.g., a communication module) that communicates with at least one external device, and at least one processor that is electrically connected with the memory and the transceiver. The at least one processor may be configured to receive an utterance place candidate group and a command for controlling a peripheral device associated with an utterance place from at least one or more other electronic devices by using the transceiver and to store the received utterance place candidate group and the received command in the memory, to select at least one utterance place based on the received utterance place candidate group, and to transmit, to a peripheral device associated with the selected utterance place, a command for controlling the peripheral device.

In accordance with another aspect of the present disclosure, a method for controlling an electronic device is provided. The method includes receiving an utterance place candidate group and a command for controlling a peripheral device associated with an utterance place from at least one or more other electronic devices, selecting at least one utterance place based on the received utterance place candidate group, and transmitting, to a peripheral device associated with the selected utterance place, a command for controlling the peripheral device.

In accordance with another aspect of the present disclosure, a non-transitory computer-readable storage medium is provided. The storage medium stores instructions that, when executed, cause at least one processor to perform a method, the method including receiving and storing an utterance place candidate group and a command for controlling a peripheral device associated with an utterance place from at least one or more other electronic devices, selecting at least one utterance place based on the received utterance place candidate group, and transmitting, to a peripheral device associated with the selected utterance place, a command for controlling the peripheral device.

According to various embodiments of the present disclosure, an electronic device may select an utterance place based on information received from a plurality of other electronic devices.

According to various embodiments of the present disclosure, the electronic device may control IoT devices adjacent to a user by transmitting, to a peripheral device associated with the utterance place, a command for controlling the peripheral device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
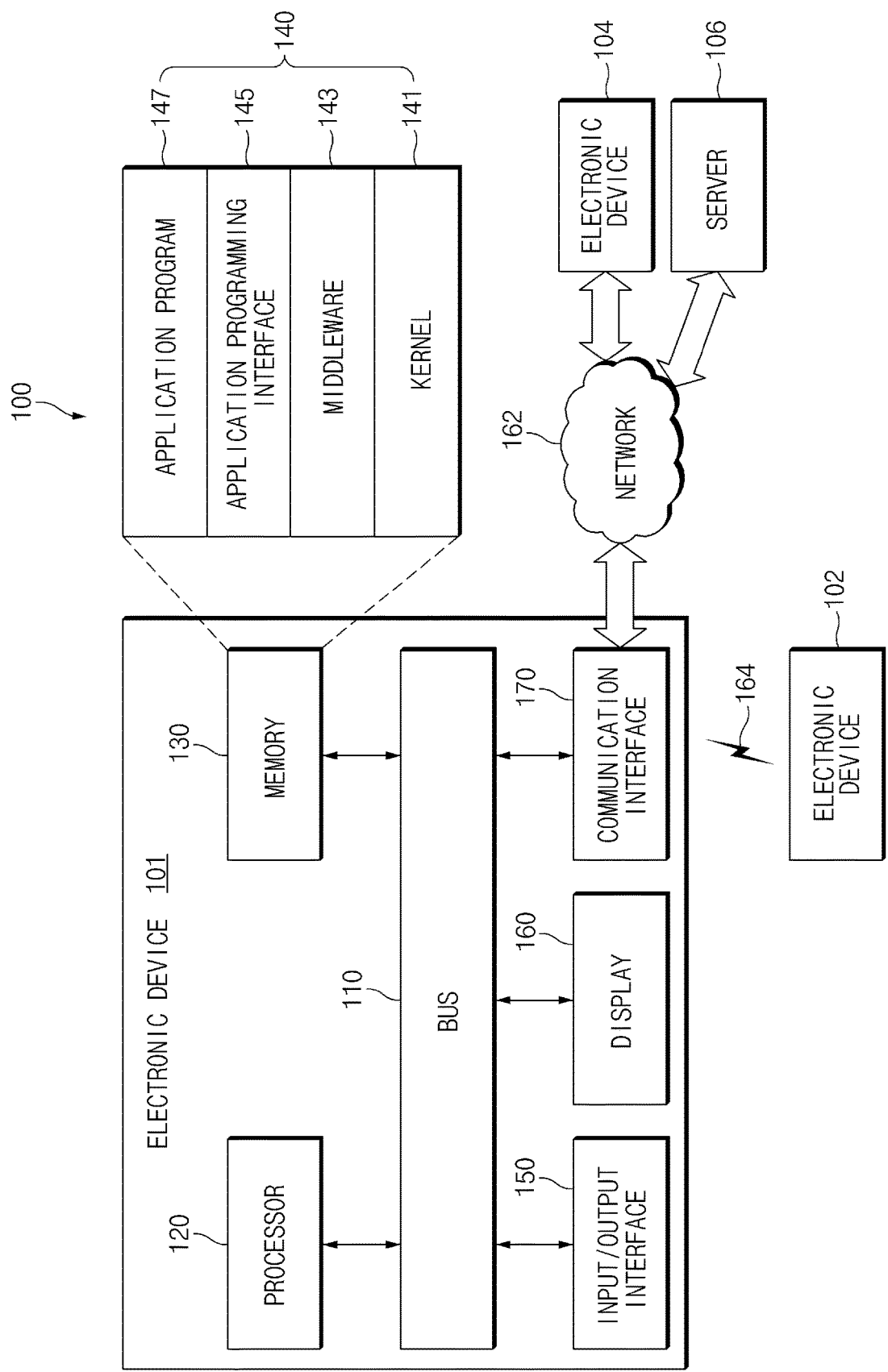
FIG. 1 is a view illustrating an electronic device in a network environment according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, description of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms of a singular form may include plural forms unless otherwise specified. In this disclosure, the expressions "A or B", "at least one of A or/and B", or "one or more of A or/and B", and the like may include any and all combinations of one or more of the associated listed items. The terms, such as "first", "second", and the like may be used to refer to various elements regardless of the order and/or the priority and to distinguish the relevant elements from other elements, but do not limit the elements. When an element (e.g., a first element) is referred to as being "(operatively or communicatively) coupled with/to" or "connected to" another element (e.g., a second element), the element may be directly coupled with/to or connected to the other element or an intervening element (e.g., a third element) may be present.

According to the situation, the expression "configured to" used in this disclosure may be used as, for example, the expression "suitable for", "having the capacity to", "adapted to", "made to", or "capable of", or "designed to" in hardware or software. The expression "a device configured to" may mean that the device is "capable of" operating together with another device or other components. For example, a "processor configured to (or set to) perform A, B, and C" may mean a dedicated processor (e.g., an embedded processor) for performing a corresponding operation or a generic-purpose processor (e.g., a central processing unit (CPU) or an application processor (AP)) which performs corresponding operations by executing one or more software programs which are stored in a memory device.

An electronic device according to various embodiments may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) audio layer 3 (MP3) players, medical devices, cameras, or wearable devices. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit). According to various embodiments, the electronic device may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, media boxes (e.g., Samsung HomeSync™, Apple TV™, or Google TV™), game consoles (e.g., Xbox™ or PlayStation™), electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, drones, automatic teller's machines (ATMs), points of sales (POSs) of stores, or internet of things (e.g., light bulbs, various sensors, sprinkler devices, fire alarms, thermostats, street lamps, toasters, exercise equipment, hot water tanks, heaters, boilers, and the like). According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be a flexible electronic device or a combination of two or more above-described devices. Furthermore, an electronic device according to an embodiment of this disclosure may not be limited to the above-described electronic devices. In this disclosure, the term "user" may refer to a person who uses an electronic device or may refer to a device (e.g., an artificial intelligence electronic device) that uses the electronic device.

FIG. 1 is a view illustrating an electronic device in a network environment according to an embodiment of the present disclosure.

Referring to FIG. 1, according to an embodiment, an electronic device 101 in a network environment 100 is described. The electronic device 101 may include a bus 110, a processor 120 (e.g., at least one processor), a memory 130, an input/output interface 150, a display 160, and a communication interface 170. According to an embodiment, the electronic device 101 may not include at least one of the above-described elements or may further include other element(s). The bus 110 may interconnect the above-described elements 110 to 170 and may include a circuit for conveying communications (e.g., a control message and/or data) among the above-described elements. The processor 120 may include one or more of a central processing unit (CPU), an application processor (AP), or a communication processor (CP). For example, the processor 120 may perform an arithmetic operation or data processing associated with control and/or communication of at least other elements of the electronic device 101.

The memory 130 may include a volatile and/or nonvolatile memory. For example, the memory 130 may store instructions or data associated with at least one other element(s) of the electronic device 101. According to an embodiment, the memory 130 may store software and/or a program 140. The program 140 may include, for example, a kernel 141, a middleware 143, an application programming interface (API) 145, and/or an application program (or "an application") 147. At least a part of the kernel 141, the middleware 143, or the API 145 may be referred to as an "operating system (OS)". For example, the kernel 141 may control or manage system resources (e.g., the bus 110, the processor 120, the memory 130, and the like) that are used to execute operations or functions of other programs (e.g., the middleware 143, the API 145, and the application program 147). Furthermore, the kernel 141 may provide an interface that allows the middleware 143, the API 145, or the application program 147 to access discrete elements of the electronic device 101 so as to control or manage system resources.

The middleware 143 may perform, for example, a mediation role such that the API 145 or the application program 147 communicates with the kernel 141 to exchange data. Furthermore, the middleware 143 may process one or more task requests received from the application program 147 according to a priority. For example, the middleware 143 may assign the priority, which makes it possible to use a system resource (e.g., the bus 110, the processor 120, the memory 130, or the like) of the electronic device 101, to at least one of the application program 147 and may process the one or more task requests. The API 145 may be an interface through which the application program 147 controls a function provided by the kernel 141 or the middleware 143, and may include, for example, at least one interface or function (e.g., an instruction) for a file control, a window control, image processing, a character control, or the like. The input/output interface 150 may transmit an instruction or data input from a user or another external device, to other element(s) of the electronic device 101 or may output an instruction or data, received from other element(s) of the electronic device 101, to a user or another external device.

The display 160 may include, for example, a liquid crystal display (LCD), a light-emitting diode (LED) display, an organic LED (OLED) display, a microelectromechanical systems (MEMS) display, or an electronic paper display. The display 160 may display, for example, various contents (e.g., a text, an image, a video, an icon, a symbol, and the like) to a user. The display 160 may include a touch screen and may receive, for example, a touch, gesture, proximity, or hovering input using an electronic pen or a part of a user's body. For example, the communication interface 170 may establish communication between the electronic device 101 and an external device (e.g., the first electronic device 102, the second electronic device 104, or the server 106). For example, the communication interface 170 may be connected to the network 162 over wireless communication (e.g., short-range communication 164) or wired communication to communicate with the external device (e.g., the second electronic device 104 or the server 106).

For example, the wireless communication may include cellular communication using at least one of long-term evolution (LTE), LTE advanced (LTE-A), code division multiple access (CDMA), wideband CDMA (WCDMA), universal mobile telecommunications system (UNITS), wireless broadband (WiBro), global system for mobile communications (GSM), or the like. The wireless communication may include at least one of Wi-Fi, Bluetooth (BT), BT low energy (BLE), Zigbee, near field communication (NFC), magnetic stripe transmission (MST), radio frequency (RF), a body area network, or the like. According to an embodiment, the wireless communication may include GNSS. The GNSS may be one of, for example, a global positioning system (GPS), a global navigation satellite system (Glonass), a Beidou navigation satellite system (hereinafter referred to as "Beidou"), or an European global satellite-based navigation system (hereinafter referred to as "Galileo"). Hereinafter, in this disclosure, "GPS" and "GNSS" may be interchangeably used. The wired communication may include at least one of, for example, a universal serial bus (USB), a high definition multimedia interface (HDMI), a recommended standard-232 (RS-232), powerline communication, a plain old telephone service (POTS), or the like. The network 162 may include at least one of telecommunications networks, for example, a computer network (e.g., local access network (LAN) or wide access network (WAN)), an internet, or a telephone network.

Each of the first and second electronic devices 102 and 104 may be a device of which the type is different from or the same as that of the electronic device 101. According to various embodiments, all or a portion of operations that the electronic device 101 will perform may be executed by another or plural electronic devices (e.g., the first electronic device 102, the second electronic device 104 or the server 106). According to an embodiment, in the case where the electronic device 101 executes any function or service automatically or in response to a request, the electronic device 101 may not perform the function or the service internally, but, alternatively additionally, it may request at least a portion of a function associated with the electronic device 101 at other electronic device (e.g., the electronic device 102 or 104 or the server 106). The other electronic device (e.g., the electronic device 102 or 104 or the server 106) may execute the requested function or additional function and may transmit the execution result to the electronic device 101. The electronic device 101 may provide the requested function or service using the received result or may additionally process the received result to provide the requested function or service. To this end, for example, cloud computing, distributed computing, or client-server computing may be used.

Figure 2:
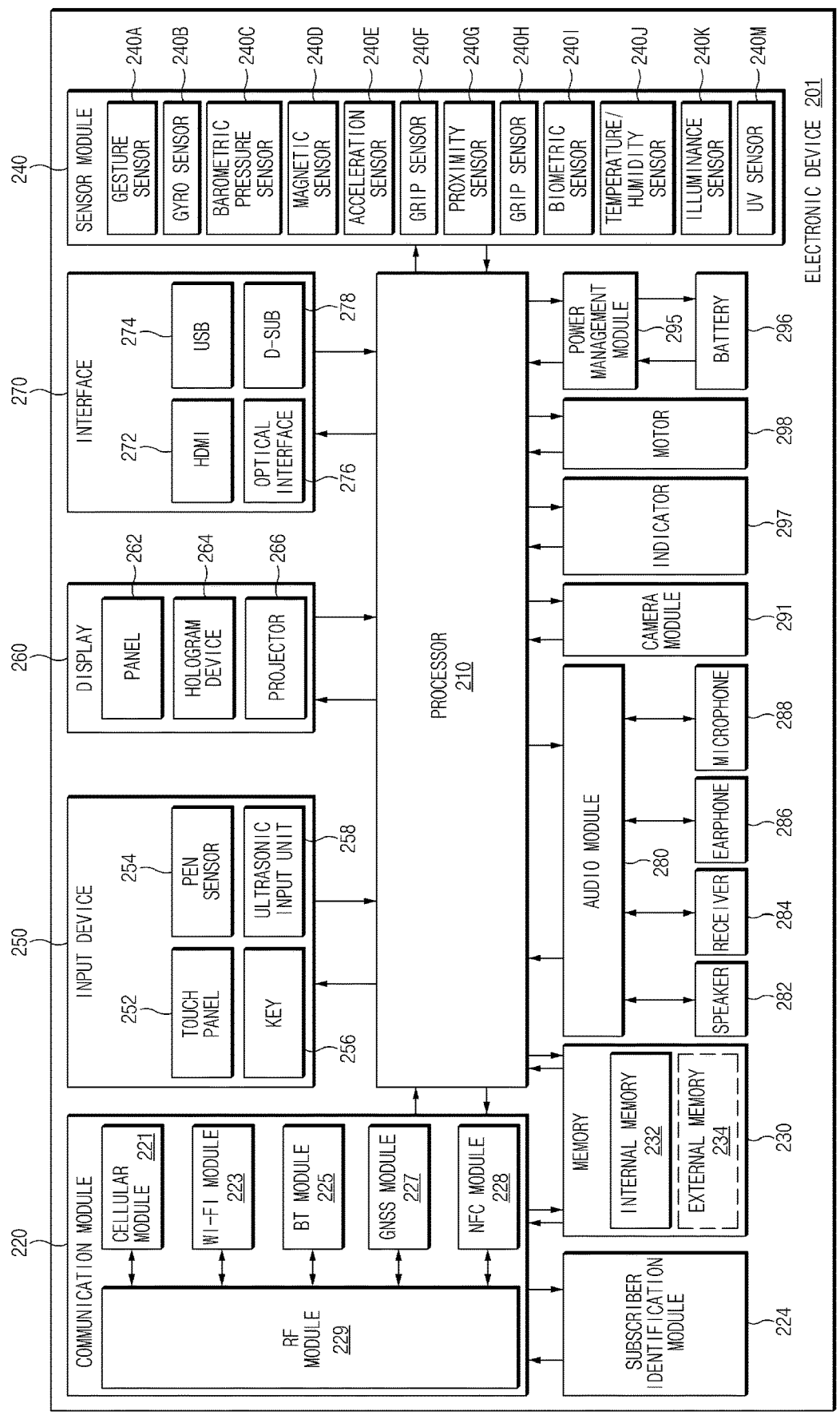
FIG. 2 is a block diagram of the electronic device according to an embodiment of the present disclosure.

FIG. 2 illustrates a block diagram of an electronic device, according to an embodiment of the present disclosure.

Referring to FIG. 2, an electronic device 201 may include, for example, all or a part of the electronic device 101 illustrated in FIG. 1. The electronic device 201 may include one or more processors (e.g., an application processor (AP)) 210, a communication module 220, a subscriber identification module 224, a memory 230, a sensor module 240, an input device 250, a display 260, an interface 270, an audio module 280, a camera module 291, a power management module 295, a battery 296, an indicator 297, and a motor 298. For example, the processor 210 may be implemented with a system on chip (SoC). According to an embodiment, the processor 210 may further include a graphic processing unit (GPU) and/or an image signal processor (ISP). The processor 210 may include at least a part (e.g., a cellular module 221) of elements illustrated in FIG. 2. The processor 210 may load an instruction or data, which is received from at least one of other elements (e.g., a nonvolatile memory), into a volatile memory and process the loaded instruction or data. The processor 210 may store result data in the nonvolatile memory.

The communication module 220 may be configured the same as or similar to the communication interface 170 of FIG. 1. The communication module 220 may include the cellular module 221, a Wi-Fi module 223, a Bluetooth (BT) module 225, a GNSS module 227, a near field communication (NFC) module 228, and a radio frequency (RF) module 229. The cellular module 221 may provide, for example, voice communication, video communication, a character service, an internet service, or the like over a communication network. According to an embodiment, the cellular module 221 may perform discrimination and authentication of the electronic device 201 within a communication network by using the subscriber identification module (e.g., a subscriber identification module (SIM) card) 224. According to an embodiment, the cellular module 221 may perform at least a portion of functions that the processor 210 provides. According to an embodiment, the cellular module 221 may include a communication processor (CP). According to an embodiment, at least a part (e.g., two or more) of the cellular module 221, the Wi-Fi module 223, the BT module 225, the GNSS module 227, or the NFC module 228 may be included within one integrated circuit (IC) or an IC package. For example, the RF module 229 may transmit and receive a communication signal (e.g., an RF signal). For example, the RF module 229 may include a transceiver, a power amplifier module (PAM), a frequency filter, a low noise amplifier (LNA), an antenna, or the like. According to another embodiment, at least one of the cellular module 221, the Wi-Fi module 223, the BT module 225, the GNSS module 227, or the NFC module 228 may transmit and receive an RF signal through a separate RF module. The subscriber identification module 224 may include, for example, a card and/or embedded SIM that includes a subscriber identification module and may include unique identify information (e.g., integrated circuit card identifier (ICCID)) or subscriber information (e.g., international mobile subscriber identity (IMSI)).

The memory 230 (e.g., the memory 130 in FIG. 1) may include an internal memory 232 or an external memory 234. For example, the internal memory 232 may include at least one of a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory, a hard drive, or a solid state drive (SSD). The external memory 234 may include a flash drive such as compact flash (CF), secure digital (SD), micro-SD, mini-SD, extreme digital (xD), a multimedia card (MMC), a memory stick, or the like. The external memory 234 may be operatively and/or physically connected to the electronic device 201 through various interfaces.

The sensor module 240 may measure, for example, a physical quantity or may detect an operation state of the electronic device 201. The sensor module 240 may convert the measured or detected information to an electric signal. For example, the sensor module 240 may include at least one of a gesture sensor 240A, a gyro sensor 240B, a barometric pressure sensor 240C, a magnetic sensor 240D, an acceleration sensor 240E, a grip sensor 240F, the proximity sensor 240G, a color sensor 240H (e.g., red, green, blue (RGB) sensor), a biometric sensor 240I, a temperature/humidity sensor 240J, an illuminance sensor 240K, or an ultra violet (UV) sensor 240M. Although not illustrated, additionally or generally, the sensor module 240 may further include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling at least one or more sensors included therein. According to an embodiment, the electronic device 201 may further include a processor that is a part of the processor 210 or independent of the processor 210 and is configured to control the sensor module 240. The processor may control the sensor module 240 while the processor 210 remains at a sleep state.

The input device 250 may include, for example, a touch panel 252, a (digital) pen sensor 254, a key 256, or an ultrasonic input unit or device 258. For example, the touch panel 252 may use at least one of capacitive, resistive, infrared (IR) and ultrasonic detecting methods. Also, the touch panel 252 may further include a control circuit. The touch panel 252 may further include a tactile layer to provide a tactile reaction to a user. The (digital) pen sensor 254 may be, for example, a part of a touch panel or may include an additional sheet for recognition. The key 256 may include, for example, a physical button, an optical key, or a keypad. The ultrasonic input device 258 may detect (or sense) an ultrasonic signal, which is generated from an input device, through a microphone (e.g., a microphone 288) and may check data corresponding to the detected ultrasonic signal.

The display 260 (e.g., the display 160 shown in FIG. 1) may include a panel 262, a hologram device 264, a projector 266, and/or a control circuit for controlling the panel 262, the hologram device 264, or the projector 266. The panel 262 may be implemented, for example, to be flexible, transparent or wearable. The panel 262 and the touch panel 252 may be integrated into a single module. According to an embodiment, the panel 262 may include a pressure sensor (or force sensor) that measures the intensity of touch pressure by a user. The pressure sensor may be implemented integrally with the touch panel 252, or may be implemented as at least one sensor separately from the touch panel 252. The hologram device 264 may display a stereoscopic image in a space using a light interference phenomenon. The projector 266 may project light onto a screen so as to display an image. For example, the screen may be arranged in the inside or the outside of the electronic device 201. The interface 270 may include, for example, a high-definition multimedia interface (HDMI) 272, a universal serial bus (USB) 274, an optical interface 276, or a D-subminiature (D-sub) 278. The interface 270 may be included, for example, in the communication interface 170 illustrated in FIG. 1. Additionally or generally, the interface 270 may include, for example, a mobile high definition link (MHL) interface, a SD card/multi-media card (MMC) interface, or an infrared data association (IrDA) standard interface.

The audio module 280 may convert a sound and an electric signal in dual directions. At least a part of the audio module 280 may be included, for example, in the input/output interface 150 illustrated in FIG. 1. The audio module 280 may process, for example, sound information that is input or output through a speaker 282, a receiver 284, an earphone 286, or the microphone 288. For example, the camera module 291 may shoot a still image or a video. According to an embodiment, the camera module 291 may include at least one or more image sensors (e.g., a front sensor or a rear sensor), a lens, an image signal processor (ISP), or a flash (e.g., an LED or a Xenon lamp). The power management module 295 may manage, for example, power of the electronic device 201. According to an embodiment, a power management integrated circuit (PMIC), a charger IC, or a battery or fuel gauge may be included in the power management module 295. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, a rectifier, or the like. The battery gauge may measure, for example, a remaining capacity of the battery 296 and a voltage, current or temperature thereof while the battery is charged. The battery 296 may include, for example, a rechargeable battery and/or a solar battery.

The indicator 297 may display a specific state of the electronic device 201 or a part thereof (e.g., the processor 210), such as a booting state, a message state, a charging state, and the like. The motor 298 may convert an electrical signal into a mechanical vibration and may generate the following effects: vibration, haptic, and the like. The electronic device 201 may include a processing device (e.g., a GPU) for supporting a mobile TV. The processing device for supporting the mobile TV may process media data according to the standards of digital multimedia broadcasting (DMB), digital video broadcasting (DVB), MediaFLO™, or the like. Each of the above-mentioned elements of the electronic device according to various embodiments of the present disclosure may be configured with one or more components, and the names of the elements may be changed according to the type of the electronic device. In various embodiments, some elements of the electronic device (e.g., the electronic device 201) may be omitted or other additional elements may be added. Furthermore, some of the elements of the electronic device may be combined with each other so as to form one entity, so that the functions of the elements may be performed in the same manner as before the combination.

An electronic device according to an embodiment may include a memory, a communication module that communicates with at least one external device, and a processor that is electrically connected with the memory and the communication module. The processor may control to receive an utterance place candidate group and a command for controlling a peripheral device associated with an utterance place from at least one or more other electronic devices by using the communication module and to store the received utterance place candidate group and the received command in the memory, to select at least one utterance place based on the received utterance place candidate group, and to transmit, to a peripheral device associated with the selected utterance place, a command for controlling the peripheral device.

In the electronic device according to an embodiment, the processor may select an utterance place, which is received as an utterance place candidate from the most other electronic devices, among the received utterance place candidate group as the at least one utterance place.

In the electronic device according to an embodiment, if an utterance place received as an utterance place candidate from the most other electronic devices is in plurality, the processor may transmit a list of the plurality of utterance places to a user device and may select an utterance place received from the user device as the at least one utterance place.

In the electronic device according to an embodiment, based on receiving, from a user device, first data including a time to receive an utterance from a user, data obtained by converting the utterance to data of a character form, and location information of the user device at a point in time to receive an utterance, the processor may create a lookup table including an utterance place, a peripheral device associated with the utterance place, an arrival time from a time when the user device receives the utterance to a time when the electronic device receives the first data, and a strength of a signal including the first data based on the utterance place.

In the electronic device according to an embodiment, based on receiving, from the user device, second data including a time to receive an utterance from a user and data obtained by converting the utterance to data of a character form, the processor may obtain an arrival time from a time when the user device receives the utterance to a time when the electronic device receives the second data.

In the electronic device according to an embodiment, the first data and the second data may be generated by which the user device recognizes an utterance of a user based on a voice recognition algorithm and converts the recognized utterance to data of a character form.

In the electronic device according to an embodiment, if the second data further includes location information of the user device at a point in time to receive the utterance, the processor may change the second data to the first data and updates a lookup table including an utterance place, a peripheral device associated with the utterance place, an arrival time from a time when the user device receives the utterance to a time when the electronic device receives the first data, and a strength of a signal including the first data based on the utterance place.

In the electronic device according to an embodiment, the user device may recognize voice of a user, converts the recognized voice to data of a character form, and obtains location information of the user device at a point in time to receive the utterance based on a phrase included in the converted character data.

In the electronic device according to an embodiment, the electronic device may function as a master hub, and the other electronic device functions as at least one of a slave hub or a user device.

In the electronic device according to an embodiment, the processor may select an utterance place candidate where the second data are generated, based on an arrival time from a time when the user device receives the utterance to a time when the electronic device receives the second data and the lookup table.

Figure 3:
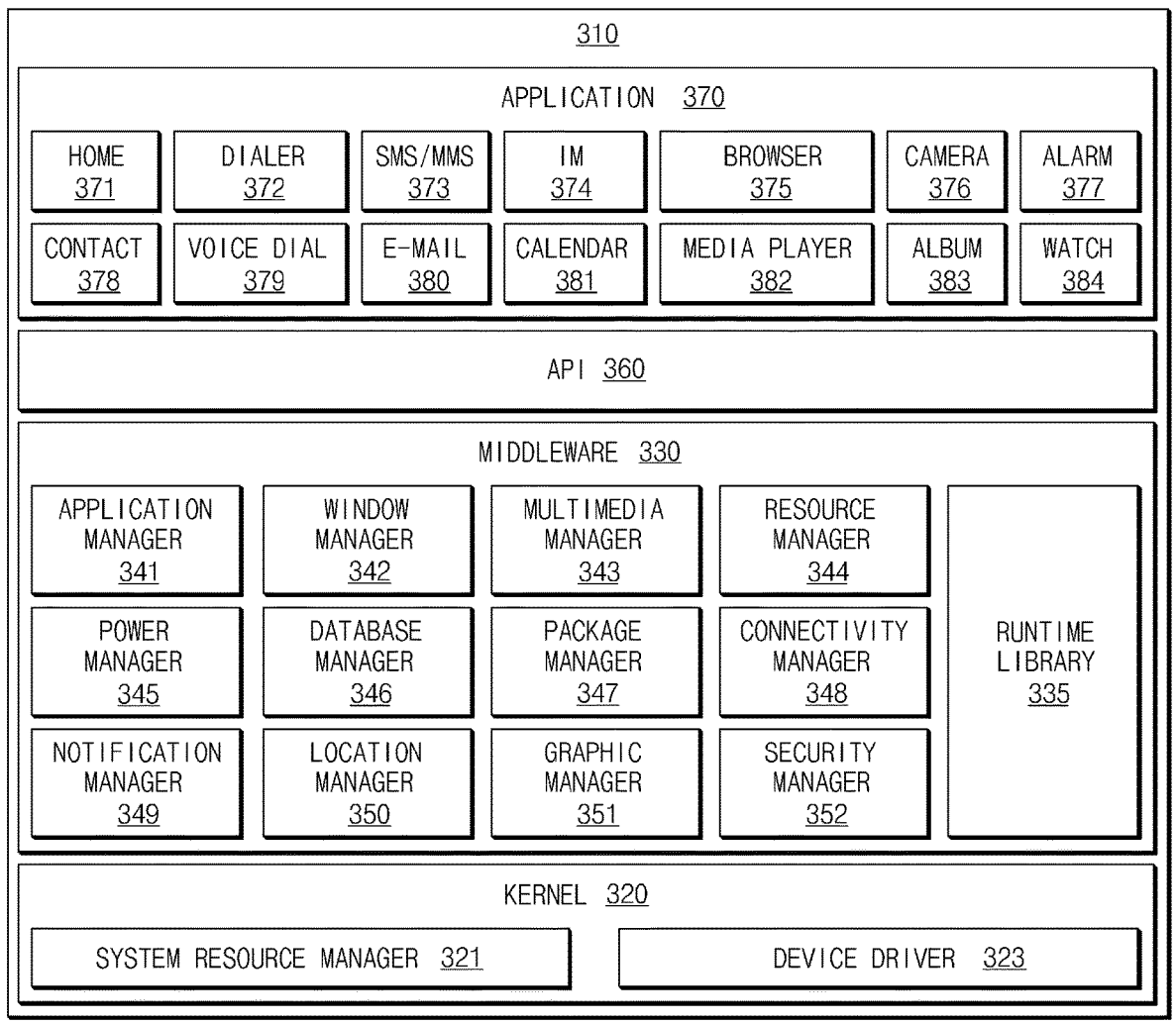
FIG. 3 is a block diagram of a program module according to an embodiment of the present disclosure.

FIG. 3 illustrates a block diagram of a program module, according to an embodiment of the present disclosure.

Referring FIG. 3, a program module 310 (e.g., the program 140) may include an operating system (OS) to control resources associated with an electronic device (e.g., the electronic device 101), and/or diverse applications (e.g., the application program 147 shown in FIG. 1) driven on the OS. The OS may be, for example, Android™, iOS™, Windows™, Symbian™, Tizen™, or Bada™. The program module 310 may include a kernel 320 (e.g., the kernel 141), a middleware 330 (e.g., the middleware 143 shown in FIG. 1), an application programming interface (API) 360 (e.g., the API 145 shown in FIG. 1), and/or an application 370 (e.g., the application program 147 shown in FIG. 1). At least a portion of the program module 310 may be preloaded on an electronic device or may be downloadable from an external electronic device (e.g., the first electronic device 102, the second electronic device 104, the server 106, or the like).

The kernel 320 (e.g., the kernel 141) may include, for example, a system resource manager 321 or a device driver 323. The system resource manager 321 may control, allocate, or retrieve system resources. According to an embodiment, the system resource manager 321 may include a process managing unit, a memory managing unit, a file system managing unit, or the like. The device driver 323 may include, for example, a display driver, a camera driver, a Bluetooth driver, a shared memory driver, a USB driver, a keypad driver, a Wi-Fi driver, an audio driver, or an inter-process communication (IPC) driver. The middleware 330 may provide, for example, a function that the application 370 needs in common, or may provide diverse functions to the application 370 through the API 360 to allow the application 370 to efficiently use limited system resources of the electronic device. According to an embodiment, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include, for example, a library module that is used by a compiler to add a new function through a programming language while the application 370 is being executed. The runtime library 335 may perform input/output management, memory management, or capacities about arithmetic functions. The application manager 341 may manage, for example, a life cycle of at least one application of the application 370. The window manager 342 may manage a graphic user interface (GUI) resource that is used in a screen. The multimedia manager 343 may identify a format necessary for playing diverse media files, and may perform encoding or decoding of media files by using a codec suitable for the format. The resource manager 344 may manage resources such as a memory space or source code of the application 370. The power manager 345 may manage a battery or power, and may provide power information for an operation of an electronic device. According to an embodiment, the power manager 345 may operate with a basic input/output system (BIOS). The database manager 346 may generate, search for, or modify database that is to be used in the application 370. The package manager 347 may install or update an application that is distributed in the form of package file.

The connectivity manager 348 may manage, for example, wireless connection. The notification manager 349 may provide an event, for example, arrival message, appointment, or proximity notification to a user. For example, the location manager 350 may manage location information about an electronic device. The graphic manager 351 may manage a graphic effect that is provided to a user, or manage a user interface relevant thereto. The security manager 352 may provide, for example, system security or user authentication. According to an embodiment, the middleware 330 may include a telephony manager for managing a voice or video call function of the electronic device or a middleware module that combines diverse functions of the above-described elements. According to an embodiment, the middleware 330 may provide a module specialized to each OS kind to provide differentiated functions. Additionally, the middleware 330 may dynamically remove a part of the preexisting elements or may add new elements thereto. The API 360 may be, for example, a set of programming functions and may be provided with a configuration that is variable depending on an OS. For example, in the case where an OS is the android or the iOS, it may provide one API set per platform. In the case where an OS is the Tizen™, it may provide two or more API sets per platform.

The application 370 may include, for example, applications such as a home 371, a dialer 372, a short message service (SMS)/multimedia message service (MIMS) 373, an instant message (IM) 374, a browser 375, a camera 376, an alarm 377, a contact 378, a voice dial 379, an e-mail 380, a calendar 381, a media player 382, an album 383, a watch 384, health care (e.g., measuring an exercise quantity, blood sugar, or the like) or offering of environment information (e.g., information of barometric pressure, humidity, temperature, or the like). According to an embodiment, the application 370 may include an information exchanging application to support information exchange between an electronic device and an external electronic device. The information exchanging application may include, for example, a notification relay application for transmitting specific information to an external electronic device, or a device management application for managing the external electronic device. For example, the notification relay application may include a function of transmitting notification information, which arise from other applications, to an external electronic device or may receive, for example, notification information from an external electronic device and provide the notification information to a user. The device management application may install, delete, or update for example, a function (e.g., turn-on/turn-off of an external electronic device itself (or a part of components) or adjustment of brightness (or resolution) of a display) of the external electronic device which communicates with the electronic device, and an application running in the external electronic device. According to an embodiment, the application 370 may include an application (e.g., a health care application of a mobile medical device) that is assigned in accordance with an attribute of an external electronic device. According to an embodiment, the application 370 may include an application that is received from an external electronic device. At least a portion of the program module 310 may be implemented by software, firmware, hardware (e.g., the processor 210 shown in FIG. 2), or a combination (e.g., execution) of two or more thereof, and may include modules, programs, routines, sets of instructions, processes, or the like for performing one or more functions.

Figure 4:
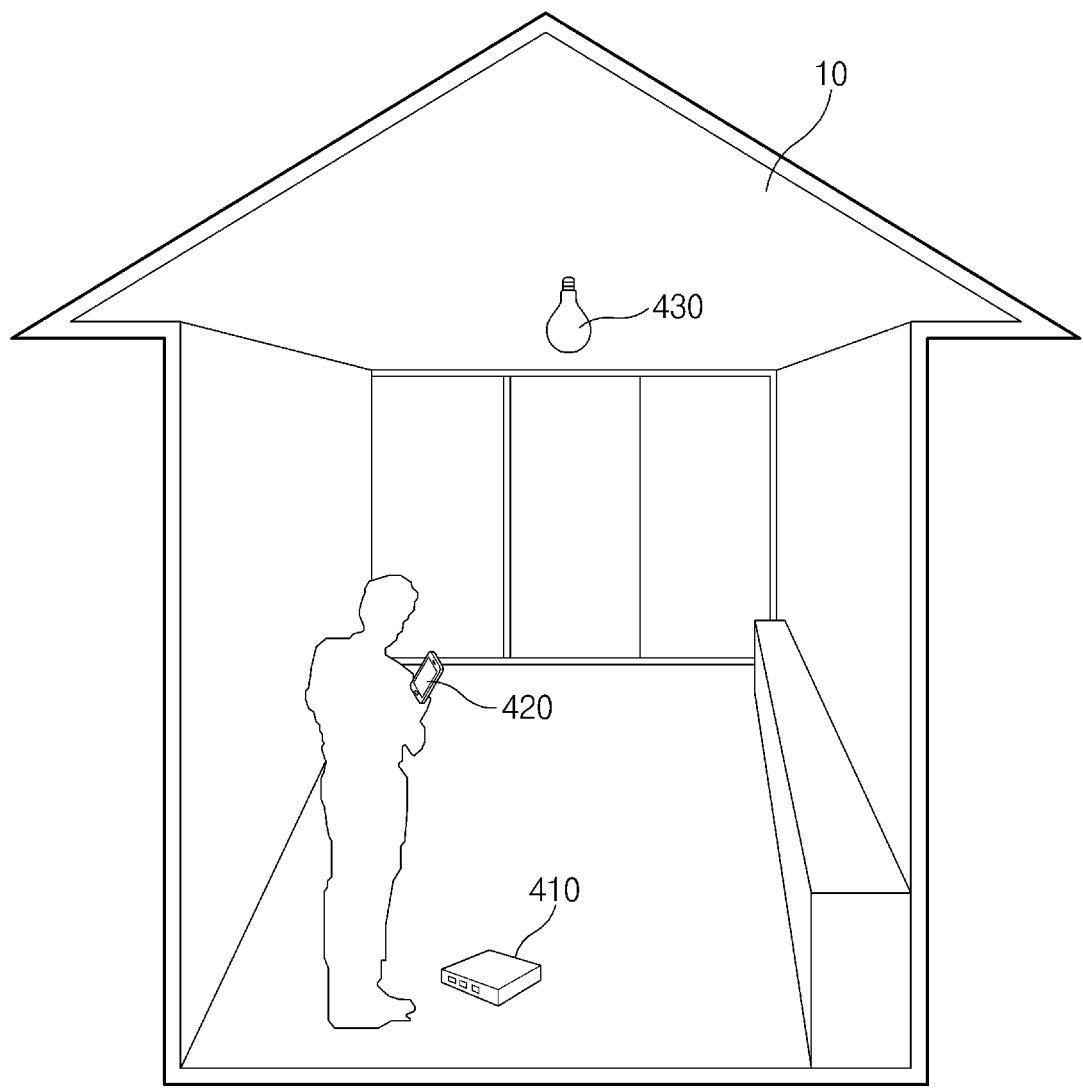
FIG. 4 is a view for describing a system controlling a plurality of peripheral devices provided in a house by using the electronic device according to an embodiment of the present disclosure.

FIG. 4 is a view for describing a system controlling a plurality of peripheral devices provided in a house by using an electronic device according to an embodiment of the present disclosure.

Referring to FIG. 4, a system may include a user device 420, an electronic device 410, and a peripheral device 430. The user device 420 of FIG. 4 may include the electronic device 101 of FIG. 1 and the electronic device 201 of FIG. 2. The user device 420, the electronic device 410, and the peripheral device 430 may be included in one space 10.

The user device 420 may communicate with the electronic device 410 and may obtain data that the electronic device 410 collects through the peripheral device 430. Also, the user device 420 may transmit a command for controlling the peripheral device 430 to the electronic device 410. According to an embodiment, the user device 420 may recognize voice of a user by using a voice recognition function and may generate and transmit the command for controlling the peripheral device 430 based on the recognized content.

As another embodiment, the user device 420 may directly communicate with the peripheral device 430. In this case, the user device 420 may directly obtain data from the peripheral device 430 or may directly transmit the command for controlling the peripheral device 430 to the peripheral device 430.

The user device 420 according to various embodiments may include, for example, at least one of a smartphone, a tablet personal computer (PC), a mobile phone, a video telephone, an e-book reader, a desktop PC, a laptop PC, a netbook computer, a personal digital assistant (PDA), a portable multimedia player (PMP), an MPEG-1 or MPEG-2 audio layer 3 (MP3) player, a mobile medical device, a camera, or a wearable device (e.g., a smart glasses, a head-mounted device (HMD), an electronic apparel, an electronic bracelet, an electronic necklace, an electronic appcessory, an electronic tattoo, a smart mirror, or a smart watch).

Also, in this disclosure, the term "user" may refer to a person who uses at least one of the peripheral device 430, the electronic device 410, or the user device 420 or may refer to a device (e.g., an artificial intelligence electronic device) that uses the devices 410, 420, and 430.

The electronic device 410 may communicate with an external device (e.g., the peripheral device 430, the user device 420, a server (not illustrated), or any other electronic device (not illustrated)) and may control the external device or may perform a controlled function controlled by the external device. Also, the electronic device 410 may perform a function of collecting data from the peripheral device 430 and transmitting the collected data to an external another device.

The electronic device 410 may be, for example, a home networking controller, a set-top box, a media device (e.g., Samsung HomeSync™, Google TV™, or Apple TV™), a game console (e.g., Microsoft XBOX™ or Sony PlayStation™), a network access point, a security control panel, a home climate controller, or a gateway.

According to an embodiment, the electronic device 410 may be, for example, a hub device. The hub device may include two kinds of hub devices: IoT hub device and general hub device. The IoT hub device may be always connected to a local internet and may provide an internet protocol (IP) service through connection with a device that does not have an IP. The general hub device may connect with an IoT device belonging to a local internet to obtain data or to control the IoT device.

The peripheral device 430 may sense a peripheral environment and may transmit the sensed data (e.g., a sensing value or sensing information based on the sensing value) to an external device (e.g., the electronic device 410, the user device 420, a server (not illustrated), or any other peripheral device (not illustrated)); alternatively, the peripheral device 430 may operate depending on a control command of the external device.

According to an embodiment, the peripheral device 430 may include the IoT device and a general device. The IoT device may communicate with a peripheral device by using its own IP, and the general device may be electrically connected with the above-described IoT hub device to make commutation with an external device possible.

The peripheral device 430 may include, for example, at least one of various sensors (e.g., a motion detection sensor, a window open/close detection sensor, a smoke detection sensor, a power output detection sensor, or the like), a gas meter, a sprinkler device, a fire alarm, a thermostat, a street lamp, athletic equipment, a hot water tank, a heater, a boiler, home appliances (e.g., a television (TV), a refrigerator, an oven, a washer, a dryer, or the like), a street lamp, an electricity meter, a gas meter, a solar power system, a sprinkler system, a thermostat, a vehicle, a wearable device, a closed circuit television (CCTV), pens, a keyboard, a mouse, a charger, furniture (e.g., a bed and a mirror), a door lock, or a security system. The wearable device may include at least one of an accessory type of device (e.g., a timepiece, a ring, a bracelet, an anklet, a necklace, glasses, a contact lens, or a head-mounted device (HMD)) or one-piece fabric or clothes type of device (e.g., electronic clothes).

According to an embodiment, the electronic device 410 and the peripheral device 430 may establish wireless communication. To establish wireless communication may mean, for example, that the electronic device 410 and the peripheral device 430 are connected with each other or are paired. Also, to establish wireless communication may mean that a channel for data exchange between the electronic device 410 and the peripheral device 430 is formed. The user device 420 may communicate with the electronic device 410 or the peripheral device 430 by using short-range communication (e.g., Bluetooth).

According to various embodiments, the peripheral device 430 and the electronic device 410 may form one local network with any other peripheral electronic devices not illustrated.

Referring to FIG. 4, the user device 420 may recognize utterance of the user and may convert the recognized result to a signal of a character form, thus performing a command based on the user utterance. For example, if the user utters "light on", the user device 420 may receive the utterance of the user and may convert the received utterance in a character form, thus recognizing a command "light on".

The user device 420 may transmit the command converted in the character form to the electronic device 410. According to an embodiment, the user device 420 may transmit the command to a plurality of electronic devices 410 at the same time. The plurality of electronic devices 410 may activate an electric light electrically connected with each electronic device connected, based on the received command "light on".

Each of a plurality of electronic devices may estimate a point, at which utterance of the user is generated, based on a time at which the utterance of the user is received and a time at which the utterance is generated and may activate an electric light adjacent to a final location of the user. Accordingly, the user may activate an electric light of a desired location without needing to specify an electric light existing at a specific location and to give commands.

Figure 5:
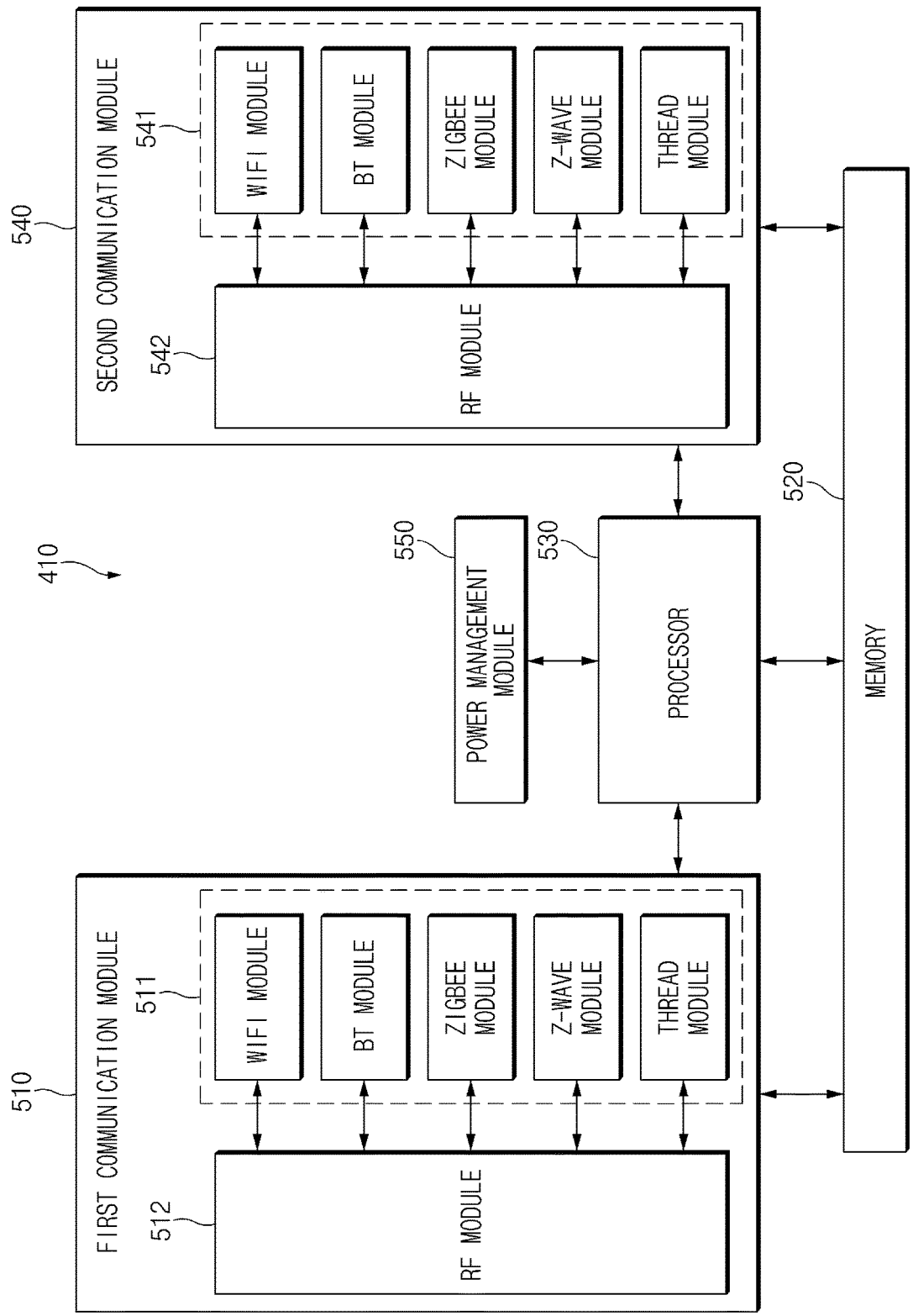
FIG. 5 is a block diagram illustrating a structure of the electronic device, according to an embodiment of the present disclosure.

FIG. 5 is a block diagram illustrating a structure of the electronic device 410, according to an embodiment of the present disclosure.

Referring to FIG. 5, the electronic device 410 may be composed of a first communication module (or a first wireless communication module) 510, a second communication module (or a second wireless communication module) 540, a power management module 550, a memory 520, and a processor (or a control circuit) 530 (e.g., at least one processor).

The first communication module 510 may include an RF module 512 transmitting and receiving an RF signal and a short-range communication module 511, and the second communication module 540 may include an RF module 542 transmitting and receiving an RF signal and a short-range communication module 541. Each of the first communication module 510 and the second communication module 540 may include a long-range module.

An example of the short-range communication modules 511 and 541 and the long-range communication modules substitutes for an example of the communication module 220 of the electronic device 201 described in FIG. 2, and a detailed description thereof will not be repeated here.

The electronic device 410 according to an embodiment may communicate with external electronic devices through the first communication module 510 and the second communication module 540. For example, the first communication module 510 may perform communication with a peripheral device (e.g., the peripheral device 430), and the second communication module 540 may perform communication with a user device (e.g., the user device 420). As another embodiment, one of the first communication module 510 and the second communication module 540 may communicate with both a peripheral device (e.g., the peripheral device 430) and a user device (e.g., the user device 420).

The electronic device 410 according to an embodiment may communicate with external electronic devices through one communication module in which the first communication module 510 and the second communication module 540 are integrated. For example, the integrated communication module (not illustrated) of the electronic device 410 may communicate with at least one or more external electronic devices (e.g., the peripheral device 430, the user device 420, or the like) through time division duplex (TDD) or frequency division duplex (FDD).

The power management module 550 may control power for driving of the electronic device 410. The power management module 550 may continuously supply external power supplied from a generator to the electronic device 410 or may supply power supplied from a battery to the electronic device 410.

The memory 520 may include an internal memory or an external memory. An example of the memory 520 is replaced with an example of the memory 230 of the electronic device described in FIG. 2, and a detailed description thereof will not be repeated here.

The processor (or control circuit) 530 may perform overall operations of the electronic device 410.

For example, the processor 530 may analyze a command received from a user device (e.g., the user device 420) to select a candidate group of a location at which a command is generated. To create a lookup table for selection of the candidate group, the processor 530 may communicate with a user device (e.g., the user device 420), may calculate an arrival time taken for a command generated from the user device (e.g., the user device 420) to arrive at the electronic device 410 for each location, and may store the calculated arrival time in the memory 520.

Also, the processor 530 may select a candidate group, the frequency of which is the highest, from among a plurality of candidate groups collected, to select a location at which the command is generated finally.

Figure 6:
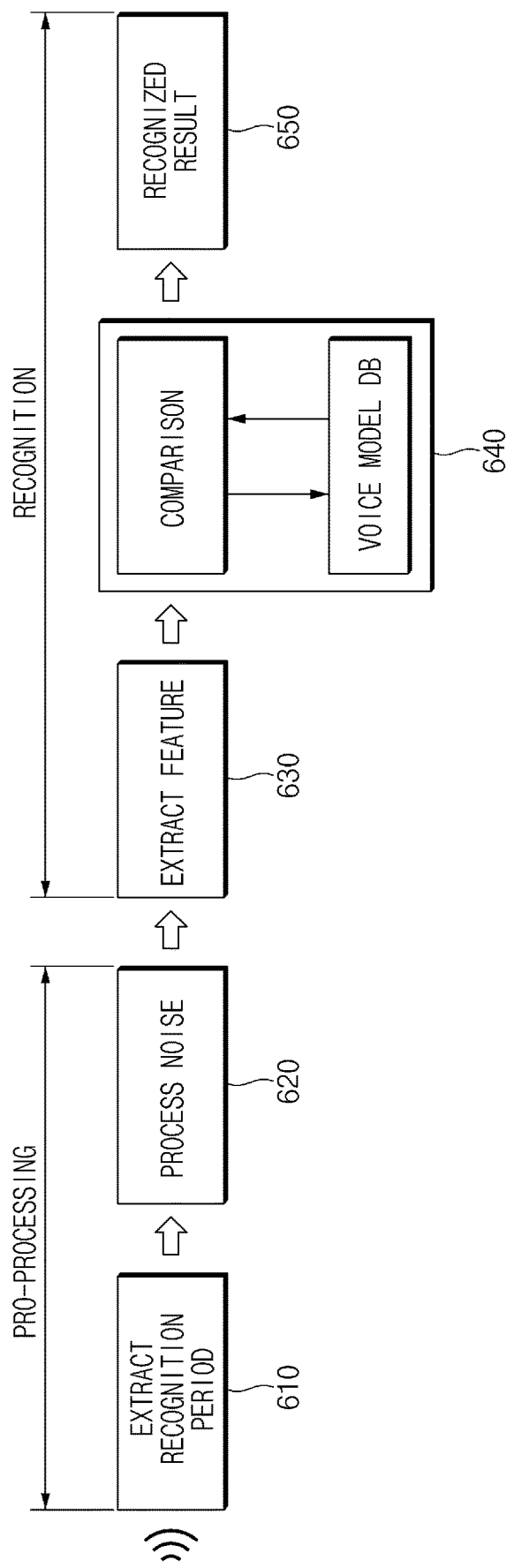
FIG. 6 is a view describing a method for recognizing voice in a user device according to an embodiment of the present disclosure.

FIG. 6 is a view describing a method for recognizing voice in a user device according to an embodiment of the present disclosure.

Referring to FIG. 6, at least one or more electronic devices (e.g., the electronic device 410, the user device 420, or the peripheral device 430) may use a voice recognition technology. For example, after a user device (e.g., the user device 420) analyzes input voice to extract a feature, the user device may measure a similarity with a database of voice models collected in advance and may convert the most similar thing to a character or an instruction. The voice recognition technology may be a kind of pattern recognition process; since voices, pronunciations, accents, etc. of persons are different, a reference pattern may be generated by collecting voice data from persons as many as possible and extracting a common feature from the collected voice data. According to an embodiment, at least one or more electronic devices may perform voice recognition based on information received through an external electronic device (e.g., the server 106 shown in FIG. 1).

Referring to FIG. 6, the voice recognition may be roughly divided into a pre-processing operation and a recognition operation. A user device (e.g., the user device 420 in FIG. 4) may obtain voice of the user through a microphone or the like. The user device (e.g., the user device 420) may analyze the obtained voice to extract a voice recognition period (610). Sound, which is actually meaningless, such as peripheral noise may be included in the obtained voice. Accordingly, the user device (e.g., the user device 420) may perform noise processing on the extracted voice recognition period (620). The above-described operations 610 and 620 may be defined as the pre-processing operation.

The user device (e.g., the user device 420) may analyze the voice from which the noise is removed through the pre-processing operation and may extract a feature for voice recognition (630). The user device (e.g., the user device 420) may compare the input voice with a voice database to output the most possible word as a recognition result (640). For example, the user device (e.g., the user device 420) may make the performance of recognition high by using a method, such as connection word recognition, continuous voice recognition, dialog recognition, or the like, upon recognizing not a simple instruction but a sentence. The user device (e.g., the user device 420) may collect regularity of an actually used linguistic pattern to use a voice recognition model for more accurate recognition.

The user device (e.g., the user device 420) may reflect the recognized result to perform a pre-defined operation (650). In addition, the user device (e.g., the user device 420) may inform the user of the recognized result by converting the recognized result to sound or by displaying the recognized result in a display (not illustrated). Also, the user device (e.g., the user device 420) may transmit the recognized result to an electronic device (e.g., the electronic device 410) to allow the electronic device 410 to perform a pre-defined operation.

Figure 7:
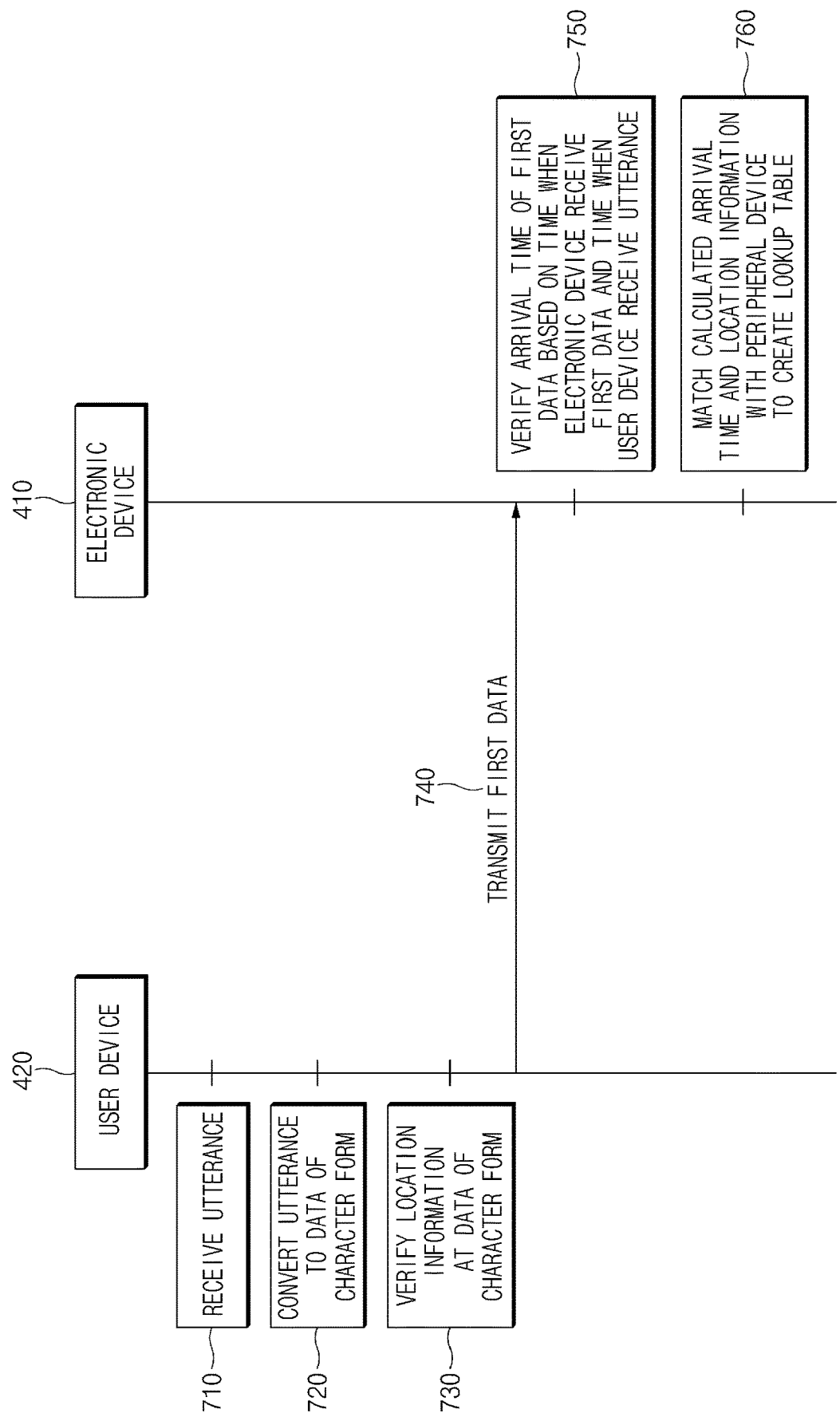
FIG. 7 is a flowchart for describing a process in which the electronic device creates a lookup table for seizing (or determining) an utterance location of a user according to an embodiment of the present disclosure.

FIG. 7 is a flowchart for describing a process in which an electronic device creates a lookup table for seizing (or determining) an utterance location of a user according to an embodiment of the present disclosure.

Referring to FIG. 7, the electronic device 410 may communicate with the user device 420 to create a lookup table associated with a location of the user.

Referring to operation 710, the user device 420 may receive utterance from the user. Referring to operation 720, the user device 420 may convert the received utterance to data of a character form. For example, the user device 420 may convert received voice in a JavaScript object notation (JSON) form.

Referring to operation 730, the user device 420 may analyze the data of the character form to seize (or determine) a location of the user. However, the way to seize (or determine) the location of the user is not limited thereto. For example, the user device 420 may seize (or determine) a location of the user by using GPS information of the user device 420 corresponding to a point at which the utterance is received or location information that is collected by using any other location sensor.

Referring to operation 740, the user device 420 may transmit, to the electronic device 410, the data converted in the character form, the location information, a time when the utterance from the user is received, etc. as first data. The user device 420 may transmit, for example, the first data to the electronic device 410 by using a short-range communication method, such as Wi-Fi, Bluetooth (BT), Bluetooth low energy (BLE), Zigbee, near field communication (NFC), magnetic secure transmission, or body area network (BAN). However, the way to transmit may not be limited thereto. For example, various wireless communication methods may be used.

Referring to operation 750, the electronic device 410 may obtain an arrival time of the first data based on a reception time of the first data received and a time when the user device 420 receives the utterance from the user. For example, the electronic device 410 may determine a time from the time when the user device 420 receives the utterance from the user to the reception time of the first data as the arrival time of the first data. Referring to operation 760, the electronic device 410 may match the calculated arrival time, signal strength, and the location information with a peripheral device adjacent to the corresponding location to create a lookup table.

Figure 8:
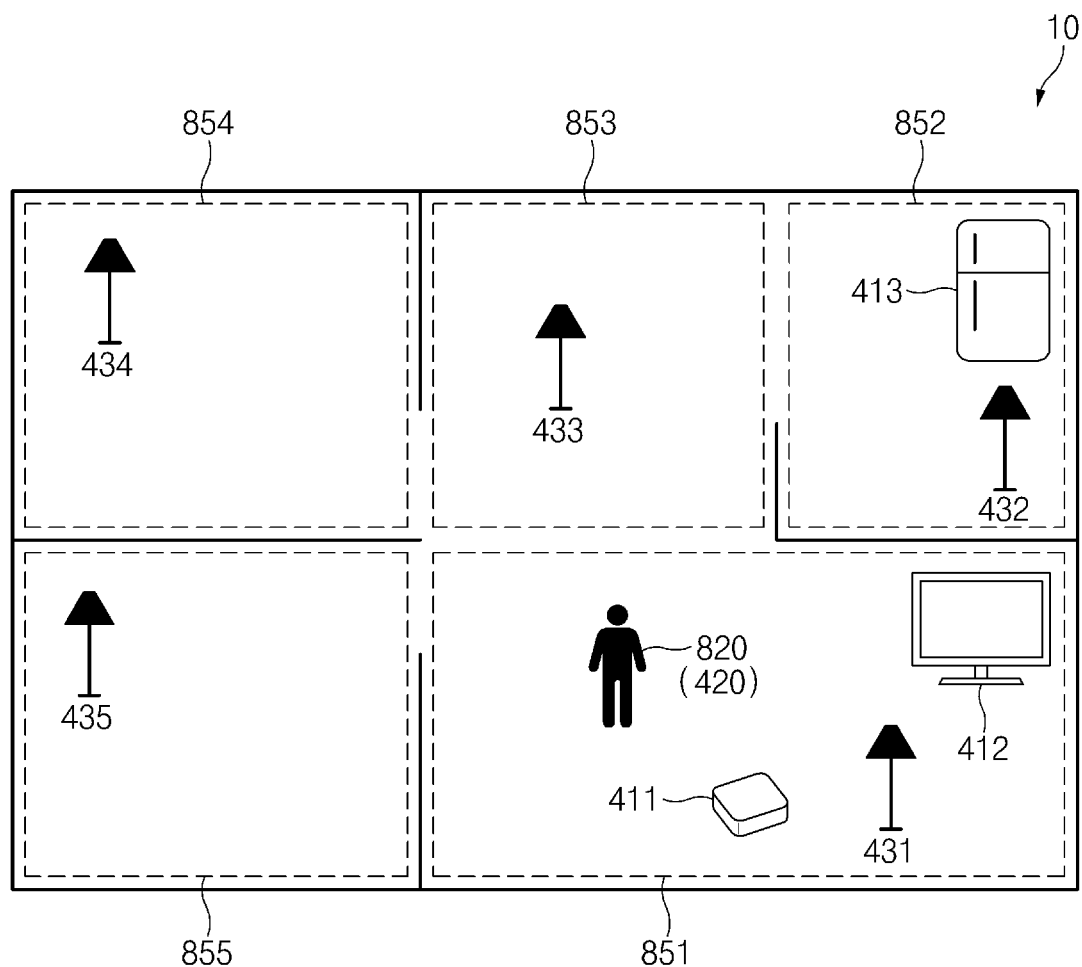
FIG. 8 is a view for describing a situation in which the electronic device builds the lookup table for seizing (or determining) a user location according to an embodiment of the present disclosure.

FIG. 8 is a view for describing a situation in which an electronic device builds a lookup table for seizing (or determining) a user location according to an embodiment of the present disclosure.

Referring to FIG. 8, a plurality of electronic devices 411, 412, and 413 and a plurality of peripheral devices 431, 432, 433, 434, and 435 may be disposed in one space 10.

The plurality of electronic devices 411, 412, and 413 may include a first electronic device 411 functioning as an IoT hub, a second electronic device 412 that functions as a general hub, and a third electronic device 413. For example, the second electronic device 412 may be a TV, and the third electronic device 413 may be a refrigerator. According to an embodiment, one of the plurality of electronic devices 411, 412, and 413 may be a master hub, and the remaining electronic devices may be slave hubs.

In FIG. 8, the first electronic device 411 may function as the master hub, and the second electronic device 412 and the third electronic device 413 may function as the slave hubs. However, roles of the hubs may not be fixed and may be changed if necessary. Below, a description will be given under the assumption that the first electronic device 411 is set to the master hub and the second electronic device 412 and the third electronic device 413 are set to the slave hubs.

The plurality of peripheral devices 431, 432, 433, 434, and 435 may include, for example, a first electric light 431, a second electric light 432, a third electric light 433, a fourth electric light 434, and a fifth electric light 435.

According to an embodiment, the plurality of electronic devices 411, 412, and 413 and the plurality of peripheral devices 431, 432, 433, 434, and 435 may be disposed in different areas belonging to the one space 10. For example, the first electric light 431, the first electronic device 411, and the second electronic device 412 may be disposed in the first area 851. The second electric light 432 and the third electronic device 413 may be disposed in the second area 852. The third electric light 433 may be disposed in the third area 853, the fourth electric light 434 in the fourth area 854, and the fifth electric light 435 in the fifth area 855.

The above-described peripheral devices 431, 432, 433, 434, and 435 and the above-described electronic devices 411, 412, and 413 may be connected with each other over one local network.

To create a lookup table in each of the electronic devices 411, 412, and 413, a user 820 may utter, for example, "here is a first area" toward a user device (e.g., the user device 420). The user device (e.g., the user device 420) may receive the utterance of the user 820 and may convert the received utterance to data of a character form. For example, the user device (e.g., the user device 420) may convert received voice to data of the JSON form.

The user device (e.g., the user device 420) may transmit the converted data of the character form and location information to the plurality of electronic devices 411, 412, and 413 as first data. The user device (e.g., the user device 420) may seize (or determine) that the user 820 is in the "first area" currently, by using a phrase "a first area" included in the character data. According to another embodiment, a user may input, to a user device (e.g., the user device 420), that the user is in the "first area" currently, by using a separate input device such as a touch screen, a physical key, or the like of the user device.

The user device (e.g., the user device 420) may transmit the converted data of the character form, the location information, and/or an utterance reception time to the plurality of electronic devices 411, 412, and 413 as first data. The user device (e.g., the user device 420) may transmit, for example, the first data to the plurality of electronic devices 411, 412, and 413 by using a short-range communication method such as Bluetooth.

Each of the electronic devices 411, 412, and 413 may receive the first data transmitted from the user device (e.g., the user device 420). Each of the electronic devices 411, 412, and 413 may calculate an arrival time from a time when the utterance is received from the user device (e.g., the user device 420) to a time when the first data are received in each of the electronic devices 411, 412, and 413. In this case, the time when the utterance is received may be replaced, for example, with a time when the first data are generated in the user device (e.g., the user device 420), a time when the first data are completely transmitted from the user device (e.g., the user device 4200, or the like.

According to an embodiment, the arrival times that the electronic devices 411, 412, and 413 respectively calculate may be different. For example, the arrival time that the first electronic device 411 calculates may be 0.6 ms, the arrival time that the second electronic device 412 calculates may be 0.7 ms, and the arrival time that the third electronic device 413 calculates may be 0.9 ms. The first electronic device 411 that functions as a master hub later may select whether a user utters at any location, by using the calculated times.

According to an embodiment, signal strengths that the electronic devices 411, 412, and 413 respectively measure may be different. For example, the signal strength that the first electronic device 411 measures may be −60 dBm, the signal strength that the second electronic device 412 measures may be −70 dBm, and the signal strength that the third electronic device 413 measures may be −90 dBm. The first electronic device 411 that functions as a master hub later may select whether the user utters at any location, by using the calculated signal strengths.

The user may move to another area to do the same behavior as the above description. As in the above description, each of the electronic devices 411, 412, and 413 may calculate an arrival time in another area. For example, the user may utter "here is a second area" in the second area 852. The user device (e.g., the user device 420) may convert received utterance to data of a character form and may transmit information about a location where the user utters and/or an utterance reception time to each of the electronic devices 411, 412, and 413 as first data.

Each of the electronic devices 411, 412, and 413 may calculate an arrival time by using the first data. Like the above-described case, the arrival times that the electronic devices 411, 412, and 413 respectively calculate may be different. For example, the arrival time that the first electronic device 411 calculates may be 0.9 ms, the arrival time that the second electronic device 412 calculates may be 0.8 ms, and the arrival time that the third electronic device 413 calculates may be 0.5 ms.

The electronic devices 411, 412, and 413 may respectively create lookup tables, such as the following table 1 to table 3, through the above-described process.

TABLE 1

Lookup Table of First Electronic Device

| User location | Peripheral device | Arrival time |
| --- | --- | --- |
| First area | First smart electric light TV | 0.6 ms |
| Second area | Second smart electric light Refrigerator | 0.9 ms |
| Third area | Third smart electric light | 0.7 ms |
| Fourth area | Fourth smart electric light | 1.0 ms |
| Fifth area | Fifth smart electric light | 0.9 ms |

TABLE 2

Lookup Table of Second Electronic Device

| User location | Peripheral device | Arrival time |
| --- | --- | --- |
| First area | First smart electric light TV | 0.7 ms |
| Second area | Second smart electric light Refrigerator | 0.8 ms |
| Third area | Third smart electric light | 0.9 ms |
| Fourth area | Fourth smart electric light | 1.2 ms |
| Fifth area | Fifth smart electric light | 1.1 ms |

TABLE 3

Lookup Table of Third Electronic Device

| User location | Peripheral device | Arrival time |
| --- | --- | --- |
| First area | First smart electric light TV | 0.9 ms |
| Second area | Second smart electric light Refrigerator | 0.5 ms |
| Third area | Third smart electric light | 0.7 ms |
| Fourth area | Fourth smart electric light | 1.1 ms |
| Fifth area | Fifth smart electric light | 1.3 ms |

According to an embodiment, a location of a user may be subdivided in the lookup tables that the electronic devices 411, 412, and 413 create. Also, it may be possible to reduce the number of user locations by integrating a plurality of areas. A user may further add or delete a peripheral device.

According to an embodiment, the user device (e.g., the user device 420) may repeatedly transmit the generated first data to the electronic devices 411, 412, and 413. Each of the electronic devices 411, 412, and 413 may configure a lookup table based on an average arrival time of a plurality of first data received.

According to an embodiment, a user location or a list of peripheral devices for each of the electronic devices 411, 412, and 413 may vary based on characteristics (e.g., an operation state, control ability, or the like) of the electronic devices 411, 412, and 413.

Figure 9:
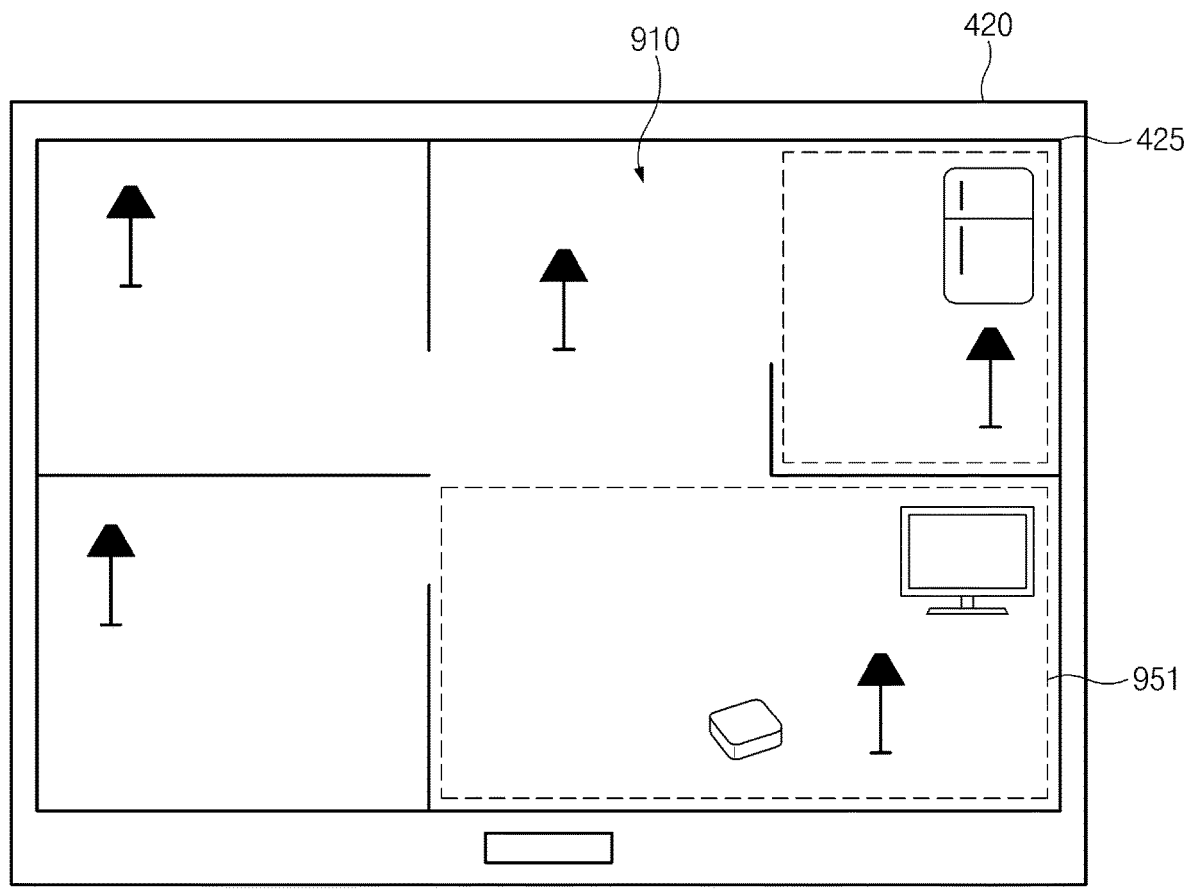
FIG. 9 is a view for describing a situation in which the electronic device builds the lookup table by using a user interface for the purpose of seizing (or determining) a user location according to an embodiment of the present disclosure.

FIG. 9 is a view for describing a situation in which an electronic device builds a lookup table by using a user interface for the purpose of seizing (or determining) a user location according to an embodiment of the present disclosure.

Referring to FIG. 9, the user device 420 according to an embodiment may provide a user interface 910 that is capable of building a lookup table. For example, the user device 420 may display the user interface 910 corresponding to the above-described one space 10 in a display 425. After moving to the first area 851 of the above-described space 10 while possessing the user device 420, a user may select a first area 951, at which the user is located, in the user interface 910.

For example, the user may select the first area 951 by touching a location corresponding to the first area 951 on the display 425. Also, the user may operate a separate physical key to select the first area 951.

The user device 420 may transmit location information and/or a selection time of the user to each of the electronic devices 411, 412, and 413 as first data. Each of the electronic devices 411, 412, and 413 may receive the first data transmitted from the user device 420. Each of the electronic devices 411, 412, and 413 may calculate an arrival time from a time when the selection is input to the user device 420 to a time when the first data are received in each of the electronic devices 411, 412, and 413.

According to an embodiment, the arrival times that the electronic devices 411, 412, and 413 respectively calculate may be different. For example, the arrival time that the first electronic device 411 calculates may be 0.6 ms, the arrival time that the second electronic device 412 calculates may be 0.7 ms, and the arrival time that the third electronic device 413 calculates may be 0.9 ms.

The user may move to the second area 852 of the above-described space 10 to do the same behavior as the above description, and each of the electronic devices 411, 412, and 413 may calculate a new arrival time by using the user's behavior.

Each of the electronic devices 411, 412, and 413 may calculate an arrival time by using the first data. Like the above-described case, the arrival times that the electronic devices 411, 412, and 413 respectively calculate may be different. For example, the arrival time that the first electronic device 411 calculates may be 0.9 ms, the arrival time that the second electronic device 412 calculates may be 0.8 ms, and the arrival time that the third electronic device 413 calculates may be 0.5 ms.

The electronic devices 411, 412, and 413 may respectively create the lookup tables, such as the above-described table 1 to table 3, through the above-described process.

Figure 10:
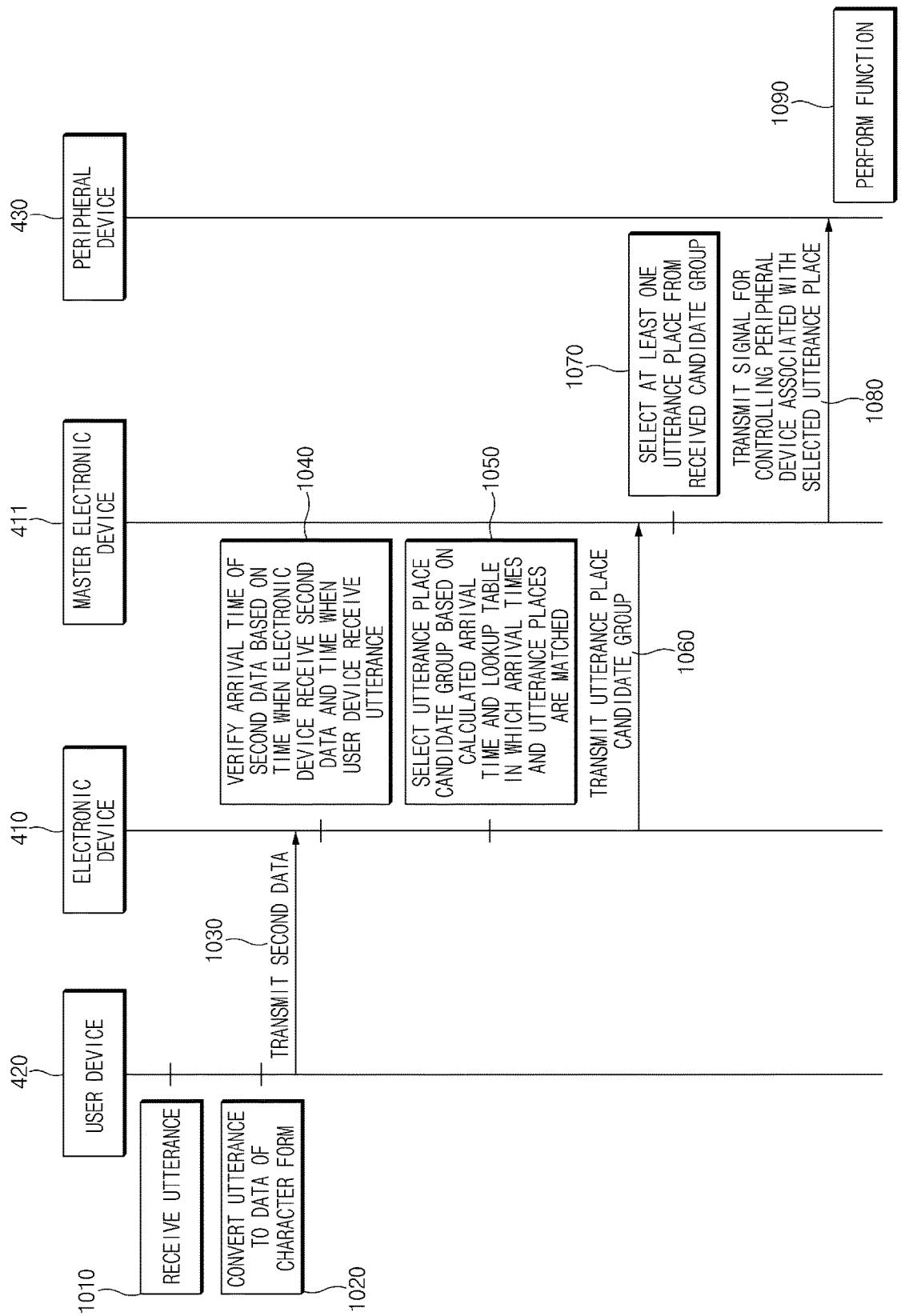
FIG. 10 is a flowchart for describing a process in which the electronic device controls a peripheral device adjacent to a user based on utterance of the user according to an embodiment of the present disclosure.

FIG. 10 is a flowchart for describing a process in which an electronic device controls a peripheral device adjacent to a user based on utterance of the user according to an embodiment of the present disclosure.

Referring to FIG. 10, at operation 1010, the user device 420 may receive utterance from the user. For example, the user device 420 may receive voice "light on". Referring to operation 1020, the user device 420 may convert the received utterance to data of a character form by using a voice recognition algorithm. For example, the user device 420 may convert the received voice to data of the JSON form.

The user device 420 may verify content included in the data of the character form converted by using the voice recognition algorithm. For example, the user device 420 may verify a phrase "light on" included in the character data based on the voice recognition algorithm stored in advance and may verify a purpose of the user intending to activate an electric light based on the verified result.

Referring to operation 1030, the user device 420 may transmit the data converted in the character form to at least one or more electronic devices (e.g., the electronic device 410) as first data.

The first data may include, for example, a time to receive the utterance from the user, the data obtained by converting the utterance in a character form, and location information of a user device at a point in time to receive the utterance, and the second data may include, for example, a time to receive the utterance from the user and the data obtained by converting the utterance in a character form. An electronic device may create a lookup table written in the table 1 to the table 3 by using the first data. The electronic device may select an utterance place candidate group by using the second data and may transmit the selected group to a master electronic device.

The user device 420 may transmit, for example, the second data to at least one or more electronic devices 410 by using a short-range communication method such as Bluetooth.

Referring to operation 1040, the at least one or more electronic devices 410 may obtain an arrival time of the second data based on a reception time of the second data received and a time when the user device 420 receives the utterance. Referring to operation 1050, the at least one or more electronic devices 410 may compare the obtained arrival time and the lookup table, in which the arrival times and the utterance places described in the table 1 to the table 3 are matched, to select an utterance place candidate group.

Referring to operation 1060, the at least one or more electronic devices 410 may transmit information about the utterance place candidate group to the master electronic device 411.

Referring to operation 1070, the master electronic device 411 may select a point of at least one of the received candidate groups as a point where the utterance is generated. For example, the master electronic device 411 may select a plurality of recommended candidate places among the received candidate groups as a point where the utterance is generated.

Referring to operation 1080, the master electronic device 411 may generate and transmit a signal for controlling the peripheral device 430 located in a first area, at which the utterance is generated, based on character data that the user device 420 converts. At operation 1090, the peripheral device 430 performs its function.

As such, according to an embodiment of the present disclosure, the user may control a peripheral device of a desired location with only a simple command that does not specify a specific location.

Figure 11:
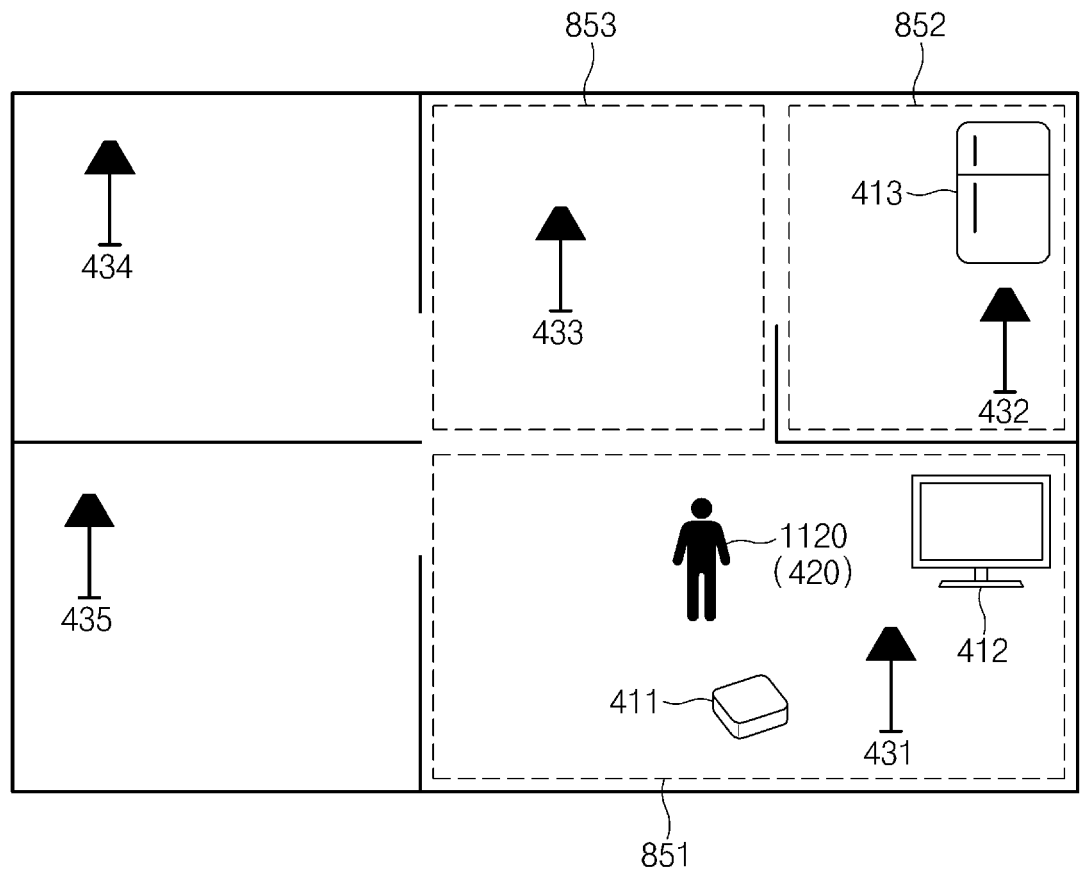
FIG. 11 is a view for describing a process in which the electronic device controls a peripheral device adjacent to a user based on utterance of the user according to an embodiment of the present disclosure.

FIG. 11 is a view for describing a process in which an electronic device controls a peripheral device adjacent to a user based on utterance of the user according to an embodiment of the present disclosure.

Referring to FIG. 11, the plurality of electronic devices 411, 412, and 413 and the plurality of peripheral devices 431, 432, 433, 434, and 435 may be disposed in one space. A configuration of the plurality of electronic devices 411, 412, and 413 and the plurality of peripheral devices 431, 432, 433, 434, and 435 is the same as that of FIG. 8, and a detailed description thereof will not be repeated here. The above-described peripheral devices 431, 432, 433, 434, and 435 and the above-described electronic devices 411, 412, and 413 may be connected with each other over one local network.

To activate a smart electric light adjacent to a user 1120, the user 1120 may utter voice "light on" toward a user device (e.g., the user device 420). The user device (e.g., the user device 420) may receive the utterance of the user 1120 and may convert the received utterance to data of a character form.

The user device (e.g., the user device 420) may change the converted data of the character form to second data and may verify the content of voice by using a voice recognition function. The second data may not include, for example, information about a location where the voice is generated, as data obtained by converting the voice in a character form.

The user device 420 may verify a purpose of the user 1120 intending to activate an electric light through a phrase "light on" included in the character data, based on the voice recognition algorithm stored in advance. However, a way to verify a purpose of a user or meaning of a phrase is not limited thereto. For example, the user device (e.g., the user device 420) may communicate with a server device including a separate voice recognition algorithm, to verify meaning of a phrase included in data of a character form.

The user device (e.g., the user device 420) may transmit the converted data of the character form and/or an utterance reception time to each of the electronic devices 411, 412, and 413 as second data. The user device (e.g., the user device 420) may transmit, for example, the second data to each of the electronic devices 411, 412, and 413 by using a short-range communication method such as Bluetooth.

Each of the electronic devices 411, 412, and 413 may receive the second data transmitted from the user device 420. Each of the electronic devices 411, 412, and 413 may calculate an arrival time from a time when the utterance is received to the user device (e.g., the user device 420) to a time when the second data are received in each of the electronic devices 411, 412, and 413.

According to an embodiment, the arrival times that the electronic devices 411, 412, and 413 respectively calculate may be different. For example, the arrival time that the first electronic device 411 calculates may be 0.6 ms, the arrival time that the second electronic device 412 calculates may be 0.7 ms, and the arrival time that the third electronic device 413 calculates may be 0.9 ms.

Each of the electronic devices 411, 412, and 413 may compare the obtained arrival time and the lookup table, in which the arrival times and the utterance places described in the table 1 to the table 3 are matched, to select an utterance place candidate group.

For example, an arrival time that the first electronic device 411 obtains may be 0.6 ms. In this case, the first electronic device 411 may select locations corresponding to an arrival time of 0.6 ms from the stored lookup table. The first electronic device 411 may select the first area 851 as a candidate group.

An arrival time that the second electronic device 412 obtains may be 0.7 ms. The second electronic device 412 may select the first area 851 as a candidate group. An arrival time that the third electronic device 413 obtains may be 0.9 ms. Accordingly, the third electronic device 413 may select the first area 851 as a candidate group.

According to another embodiment, each of the electronic devices 411, 412, and 413 may select a candidate group after setting a margin of a constant value in an arrival time. For example, the electronic devices 411, 412, and 413 may select candidate groups with a margin time of 0.1 ms. In this case, the first electronic device 411 may select the first area 851 and the third area 853 as a candidate group.

The second electronic device 412 may select the first area 851 and the second area 852 as a candidate group. The third electronic device 413 may select the first area 851 as a candidate group.

According to an embodiment, the first electronic device 411, the second electronic device 412, and the third electronic device 413 may transmit the selected candidate groups to the pre-defined master electronic device 411. For example, the second electronic device 412 and the third electronic device 413 may transmit the second data to the master electronic device 411 by using a short-range communication method such as Bluetooth.

The master electronic device 411 may select a point of at least one of the received candidate groups as a point where the utterance is generated. For example, the master electronic device 411 may select a candidate, which the majority of the plurality of electronic devices 411, 412, and 413 selects, from the received candidate groups as a point where the utterance is generated. For example, the master electronic device 411 may select the first area 851 as a point where the utterance is generated.

The master electronic device 411 may generate a signal for activating a peripheral device (e.g., the peripheral device 430) located in the first area where the utterance is generated and may transmit the generated signal to the peripheral device. For example, the master electronic device 411 may generate a signal for activating the first electric light 431 and may transmit the signal to the first electric light 431; the first electric light 431 may be activated an electric light based on the received signal.

Figure 12:
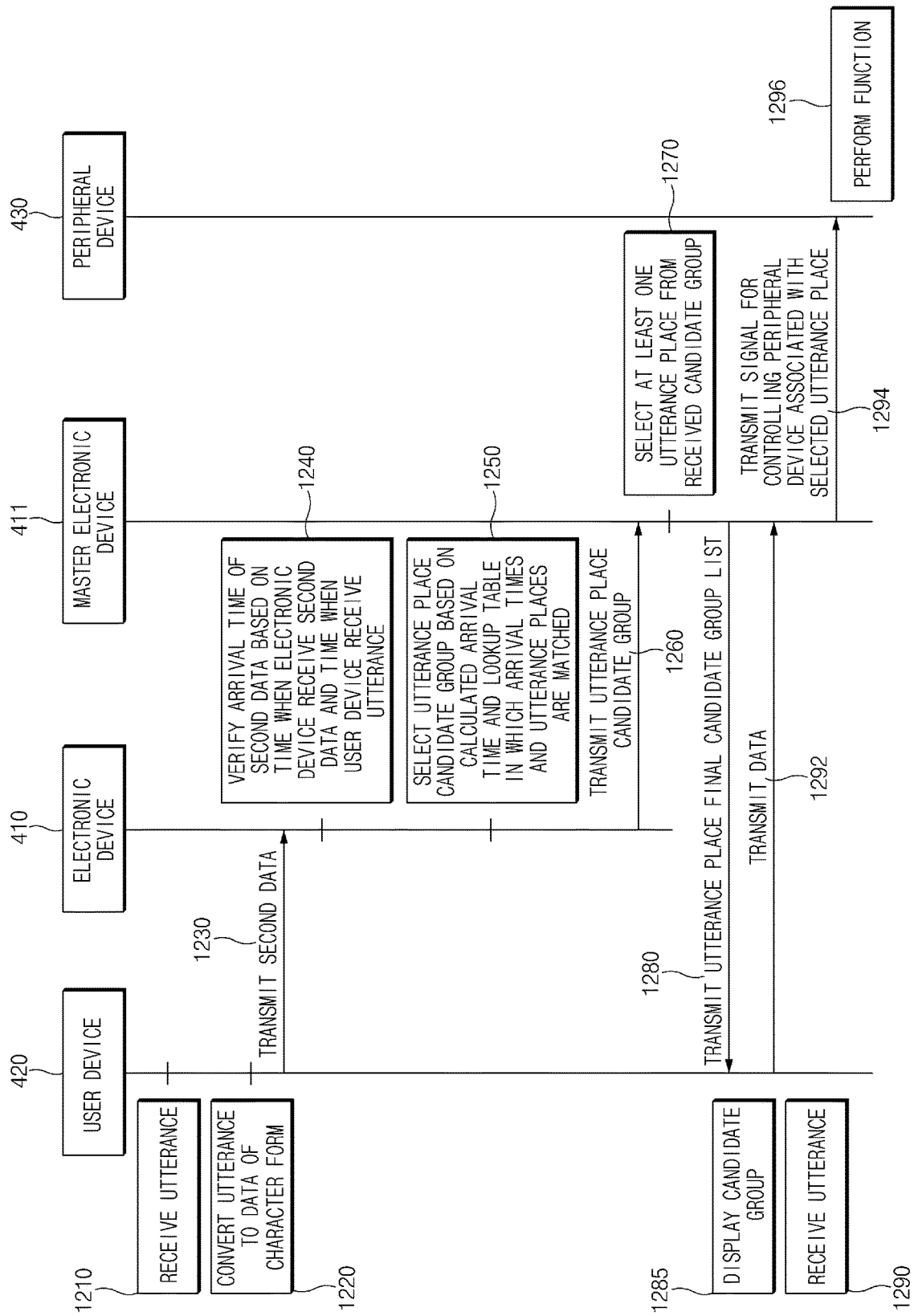
FIG. 12 is a flowchart for describing a process of obtaining confirmation of a user additionally when the electronic device controls the peripheral device adjacent to a user based on utterance of the user according to an embodiment of the present disclosure.

FIG. 12 is a flowchart for describing a process of obtaining confirmation of a user additionally when an electronic device controls a peripheral device adjacent to a user based on utterance of the user according to an embodiment of the present disclosure.

Referring to FIG. 12, with regard to operation 1210 to operation 1270, a description that is the same as or similar to the description given in FIG. 10 will not be repeated here.

Referring to FIG. 12, at operation 1210, the user device 420 may receive utterance from a user. Referring to operation 1220, the user device 420 may convert the received utterance to data of a character form.

Referring to operation 1230, the user device 420 may transmit the data converted in the character form to at least one or more electronic devices 410 as second data. Referring to operation 1240, the at least one or more electronic devices 410 may obtain an arrival time of the second data based on a time to receive the second data and a time when the user device 420 receives the utterance.

Referring to operation 1250, the at least one or more electronic devices 410 may compare the obtained arrival time and the lookup table, in which the arrival times and the utterance places described in the table 1 to the table 3 are matched, to select an utterance place candidate group.

Referring to operation 1260, the at least one or more electronic devices 410 may transmit information about the utterance place candidate group to the master electronic device 411.

Referring to operation 1270, the master electronic device 411 may select a point of one of the received candidate groups as a point where the utterance is generated. For example, the master electronic device 411 may select a location, which is selected the most as a candidate group, from the received candidate groups as a point where the utterance is generated.

According to an embodiment, in the case where a plurality of locations are selected from a candidate group, the master electronic device 411 may activate all peripheral devices located at a plurality of areas. However, in another embodiment, the master electronic device 411 may again verify whether a user wants any point among utterance generation points belonging to a candidate group.

Referring to operation 1280, the master electronic device 411 may transmit an utterance place final candidate group list to the user device 420. Referring to operation 1285, the user device 420 may provide the received utterance place final candidate group list to the user. For example, the user device 420 may display the utterance place final candidate group list in a display or may inform the user of the utterance place final candidate group list by using a speaker.

Referring to operation 1290, the user device 420 may receive an input to decide an utterance place from the user. For example, the user device 420 may receive an utterance to determine an area, at which a user wants activation of a peripheral device, among the final candidate group list. For another example, the user device 420 may obtain a user input to select a desired location among an utterance place candidate group displayed in a display.

Referring to operation 1292, the user device 420 may convert input information of the user to data of a character form and may transmit the converted data to the master electronic device 411.

Referring to operation 1294, the master electronic device 411 may generate a signal to activate the peripheral device 430 of the area that the user decides and may transmit the signal to the peripheral device 430. At operation 1296, the peripheral device 430 performs its function.

According to another embodiment, the user device 420 may transmit data for controlling the peripheral device 430 to the electronic device 410 based on information of a location that the user selects. The electronic device 410 may generate a signal to activate the peripheral device 430 of the area that the user decides and may transmit the signal to the peripheral device 430.

Figure 13:
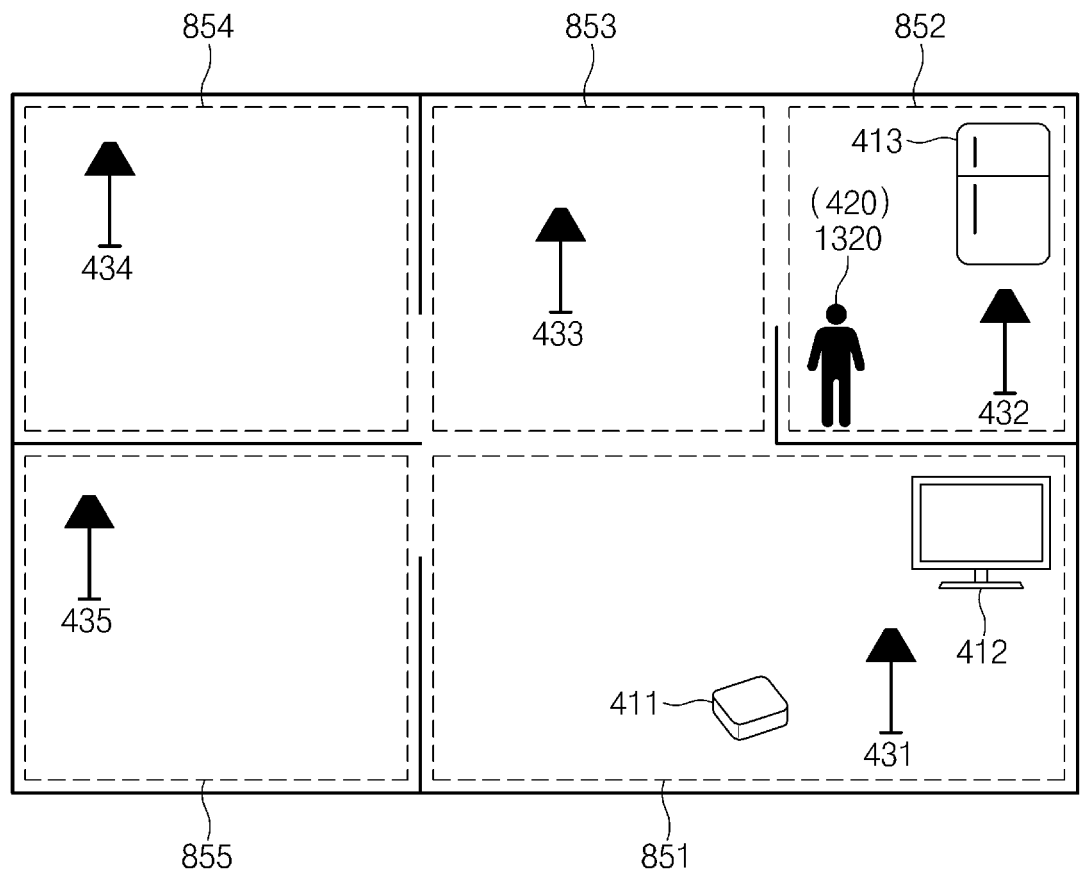
FIG. 13 is a view for describing a situation to obtain confirmation of a user additionally when the electronic device controls the peripheral device adjacent to a user based on utterance of the user according to an embodiment of the present disclosure.

FIG. 13 is a view for describing a situation to obtain confirmation of a user additionally when an electronic device controls a peripheral device adjacent to a user based on utterance of the user according to an embodiment of the present disclosure.

Referring to FIG. 13, to activate an electric light adjacent to a user 1320, the user 1320 may utter voice "light on" toward a user device (e.g., the user device 420). The user device (e.g., the user device 420) may receive the utterance of the user 1320 and may convert the received utterance to data of a character form.

The user device (e.g., the user device 420) may change the converted data of the character form to second data and may verify the content of voice by using a voice recognition function. For example, the user device (e.g., the user device 420) may verify that a phrase "light on" included in the character data indicates a purpose of the user 1320 intending to activate an electric light, based on the voice recognition algorithm stored in advance. The user device (e.g., the user device 420) may transmit the converted data of the character form and/or an utterance reception time to each of the electronic devices 411, 412, and 413 as second data.

Each of the electronic devices 411, 412, and 413 may receive the second data transmitted from the user device (e.g., the user device 420). Each of the electronic devices 411, 412, and 413 may calculate an arrival time based on a time when the utterance is received to the user device (e.g., the user device 420) and a time when the second data are received in each of the electronic devices 411, 412, and 413.

According to an embodiment, the arrival times that the electronic devices 411, 412, and 413 respectively calculate may be different. For example, an arrival time that the first electronic device 411 obtains may be 0.9 ms. In this case, the first electronic device 411 may select locations corresponding to an arrival time of 0.9 ms from the stored lookup table. The first electronic device 411 may select the second area 852 and the fifth area 855 as a candidate group.

An arrival time that the second electronic device 412 calculates may be 0.9 ms. The second electronic device 412 may select the third area 853 as a candidate group. An arrival time that the third electronic device 413 calculates may be 1.1 ms. Accordingly, the third electronic device 413 may select the fourth area 854 as a candidate group.

According to another embodiment, each of the electronic devices 411, 412, and 413 may select a candidate group after setting a margin of a constant value in an arrival time. For example, the electronic devices 411, 412, and 413 may select candidate groups with a margin time of 0.1 ms. In this case, the first electronic device 411 may select the second area 852, the fourth area 854, and the fifth area 855 as a candidate group.

The second electronic device 412 may select the first area 851, the second area 852, and the third area 853 as a candidate group. The third electronic device 413 may select the fourth area 854 as a candidate group.

The first electronic device 411, the second electronic device 412, and the third electronic device 413 may transmit the selected candidate groups to the pre-defined master electronic device 411.

The master electronic device 411 may select a point of at least one of the received candidate groups as a point where the utterance is generated. For example, the master electronic device 411 may select a candidate group, the frequency of which is the highest, from among the received candidate groups as a point where the utterance is generated.

According to an embodiment, the master electronic device 411 may again verify whether the user 1320 wants any point among utterance generation points belonging to a candidate group. In detail, the master electronic device 411 may transmit an utterance place final candidate group list to the user device 420. For example, the master electronic device 411 may determine the second area 852 and the fourth area 854 as a candidate group and may transmit the determined result to the user device 420.

The user device (e.g., the user device 420) may inform the user 1320 of a received utterance place final candidate group list. For example, the user device (e.g., the user device 420) may display an utterance place final candidate group in a display. Also, the user device (e.g., the user device 420) may inform of the utterance place final candidate group by using a speaker.

The user device (e.g., the user device 420) may receive the utterance to decide an utterance place from the user 1320. For example, the user 1320 may make an utterance to determine the second area 852, at which the user 1320 wants activation of an electric light, among the final candidate group list. However, the way for the user 1320 to decide an area is not limited thereto. For example, the user 1320 may select a desired location among the utterance place final candidate group displayed in a display of the user device (e.g., the user device 420).

The user device (e.g., the user device 420) may convert an utterance of the user 1320 to data of a character form and may transmit the converted data to the master electronic device 411.

The master electronic device 411 may generate a signal to activate the peripheral device 430 of the area that the user decides and may transmit the signal to the peripheral device 430. For example, the master electronic device 411 may generate a signal to activate the second electric light 432 adjacent to the second area 852 based on a command "second area" and may transmit the signal to the second electric light 432. The second electric light 432 may activate an electric light based on the received signal.

According to an embodiment, in the case where a word specifying a specific location is present in words included in an utterance of a user converted to data of a character form, the electronic devices 411, 412, and 413 may further decrease the number of utterance location candidate groups to be selected. For example, in the case where the user 1320 utters "TV on", the user device (e.g., the user device 420) may convert the utterance to data of a character form and may transmit the converted data to the first electronic device 411.

The first electronic device 411 may receive the data converted in the character form to calculate an arrival time of data. For example, in the case where the arrival time of data is 0.6 ms, the first electronic device 411 may select a first area and a third area as an utterance location candidate group in consideration of a margin arrival time. In this case, since "TV" is included in the data of the character form, the first electronic device 411 may select the first area where TV is located, as a final utterance location candidate.

According to another embodiment, in the case where a word specifying a specific location is present in words included in an utterance of a user converted to data of a character form, the electronic devices 411, 412, and 413 may further decrease the number of utterance location candidate groups to be selected. For example, in the case where the user 1320 utters "second area light on", the user device (e.g., the user device 420) may convert the utterance to data of a character form and may transmit the converted data to the first electronic device 411.

The first electronic device 411 may receive the data converted in the character form to calculate an arrival time of data. For example, in the case where the arrival time of data is 0.9 ms, the first electronic device 411 may select a second area and a fifth area as an utterance location candidate group in consideration of a margin arrival time. In this case, since "second area" is included in the data of the character form, the first electronic device 411 may select the second area as a final utterance location candidate.

Figure 14:
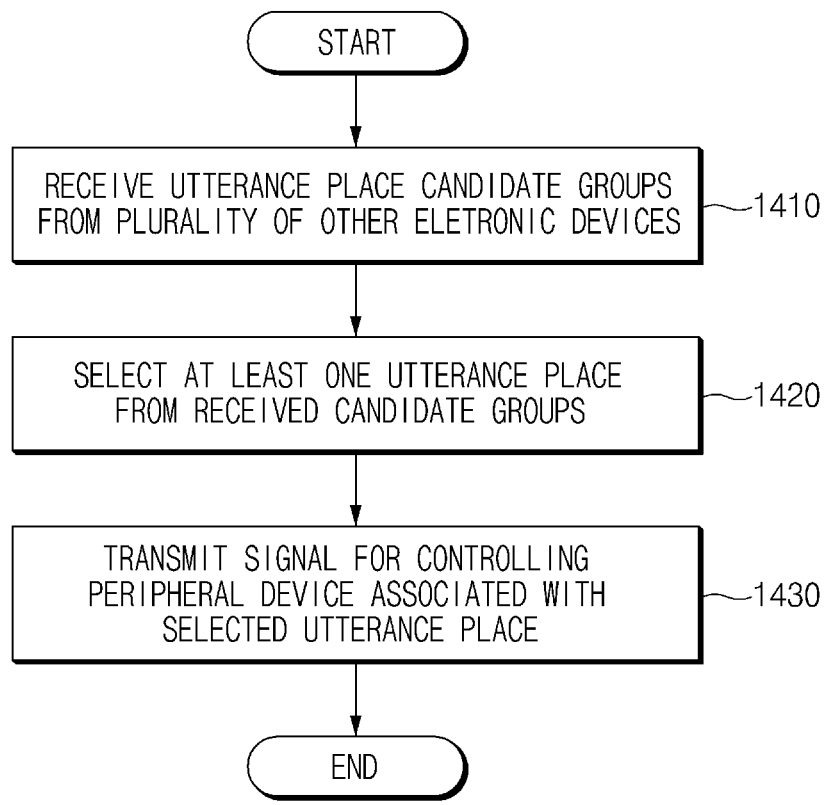
FIG. 14 is a flowchart for describing a process in which the electronic device controls the peripheral device adjacent to a user based on utterance of the user according to an embodiment of the present disclosure.

FIG. 14 is a flowchart for describing a process in which an electronic device controls a peripheral device adjacent to a user based on utterance of the user according to an embodiment of the present disclosure.

Referring to FIG. 14, in operation 1410, an electronic device (e.g., the electronic device 410) may receive an utterance place candidate group list from a plurality of other electronic devices. The electronic device (e.g., the electronic device 410) may compare the utterance place candidate group list with a lookup table in which an utterance place and a peripheral device, an arrival time, a signal strength, and location information stored in advance are included, to verify peripheral devices controllable in connection with an utterance place.

Referring to operation 1420, the electronic device (e.g., the electronic device 410) may select a point of at least one of the plurality of utterance place candidate groups received as a point where the utterance is generated. For example, the electronic device (e.g., the electronic device 410) may select a candidate point, the frequency of which is the highest, among the received candidate groups as a point where the utterance is generated.

According to another embodiment, in the case where candidates having the same frequency exist, the electronic device (e.g., the electronic device 410) may transmit utterance place group list information in which candidates have the same frequency, to a user device. The user device may suggest the received list to a user and may guide the user to decide a finally desired utterance place. The user device may transmit information about the decided utterance place to the electronic device (e.g., the electronic device 410).

Referring to operation 1430, the electronic device (e.g., the electronic device 410) may generate a signal for controlling a peripheral device associated with the selected utterance place. For example, the electronic device (e.g., the electronic device 410) may generate a signal that makes it possible to transmit, to a peripheral device, a command that the user device obtains by analyzing an utterance of the user. The electronic device (e.g., the electronic device 410) may transmit the generated signal to a relevant peripheral device to allow the relevant peripheral device to perform a predefined function according to the utterance of the user.

A controlling method of an electronic device according to an embodiment may include receiving an utterance place candidate group and a command for controlling a peripheral device associated with an utterance place from at least one or more other electronic devices, selecting at least one utterance place based on the received utterance place candidate group, and transmitting, to a peripheral device associated with the selected utterance place, a command for controlling the peripheral device.

In the controlling method according to an embodiment, the selecting of the at least one utterance place based on the received utterance place candidate group may include selecting an utterance place, which is received as an utterance place candidate from the most other electronic devices, among the received utterance place candidate group as the at least one utterance place.

If an utterance place received as an utterance place candidate from the most other electronic devices is in plurality, the controlling method may include transmitting a list of the plurality of utterance places to a user device and selecting an utterance place received from the user device as the at least one utterance place.

The controlling method may include, based on receiving, from a user device, first data including a time to receive an utterance from a user, data obtained by converting the utterance to data of a character form, and location information of the user device at a point in time to receive an utterance, generating a lookup table including an utterance place, a peripheral device associated with the utterance place, an arrival time from a time when the user device receives the utterance to a time when the electronic device receives the first data, and a strength of a signal including the first data based on the utterance place.

The controlling method may include, based on receiving, from the user device, second data including a time to receive an utterance from a user and data obtained by converting the utterance to data of a character form, deducing an arrival time from a time when the user device receives the utterance to a time when the electronic device receives the second data.

In the controlling method according to an embodiment, the first data and the second data may be generated by which the user device recognizes an utterance of a user based on a voice recognition algorithm and converts the recognized utterance to data of a character form.

If the second data further includes location information of the user device at a point in time to receive the utterance, the controlling method according to an embodiment may include changing the second data to the first data, and updating a lookup table including an utterance place, a peripheral device associated with the utterance place, an arrival time from a time when the user device receives the utterance to a time when the electronic device receives the first data, and a strength of a signal including the first data based on the utterance place.

In the controlling method according to an embodiment, the electronic device may function as a master hub, and the other electronic device may function as at least one of a slave hub or a user device.

The controlling method according to an embodiment may include selecting an utterance place candidate where the second data are generated, based on an arrival time from a time when the user device receives the utterance to a time when the electronic device receives the second data and the lookup table.

The term "module" used in this disclosure may include a unit composed of hardware, software and firmware and may be interchangeably used with the terms "unit", "logic", "logical block", "component" and "circuit". The "module" may be an integrated component or may be a minimum unit for performing one or more functions or a part thereof. The "module" may be implemented mechanically or electronically and may include at least one of an application-specific IC (ASIC) chip, a field-programmable gate array (FPGA), and a programmable-logic device for performing some operations, which are known or will be developed. At least a part of an apparatus (e.g., modules or functions thereof) or a method (e.g., operations) according to various embodiments may be, for example, implemented by instructions stored in computer-readable storage media (e.g., the memory 130) in the form of a program module. The instruction, when executed by a processor (e.g., the processor 120), may cause the processor to perform a function corresponding to the instruction. A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and an internal memory. Also, a program instruction may include not only a mechanical code such as things generated by a compiler but also a high-level language code executable on a computer using an interpreter. A module or a program module according to various embodiments may include at least one of the above elements, or a part of the above elements may be omitted, or other elements may be further included. Operations performed by a module, a program module, or other elements according to various embodiments may be executed sequentially, in parallel, repeatedly, or in a heuristic method or some operations may be executed in different sequences or may be omitted. Alternatively, other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   a memory;
   a transceiver configured to communicate with at least one external device; and
   at least one processor electrically connected with the memory and the transceiver,
   wherein the at least one processor is configured to:
      receive a command for controlling at least one peripheral device based on a user's utterance from a user device,
      receive, from other electronic devices, utterance place candidate groups, wherein each of the utterance place candidate groups includes at least one candidate utterance place selected by one of the other electronic devices based on the command,
      store the received utterance place candidate groups and the received command in the memory,
      determine a most frequent utterance place in the received utterance place candidate groups as an utterance place based on the received utterance place candidate groups, and
      transmit, to the at least one peripheral device associated with the determined utterance place, the command.

2. The electronic device of claim 1, wherein, if two or more most frequent utterance places are existing in the utterance place candidate groups, the at least one processor is further configured to transmit a list of the two or more most frequent utterance places to the user device and selects the utterance place among the two or more most frequent utterance places based on a signal received from the user device.

3. The electronic device of claim 1, wherein, based on receiving; from the user device, first data including reception time information indicating a time of an utterance from a user, data obtained by converting the utterance to data in a character form, and location information of the user device at the reception of the utterance, the at least one processor is further configured to generate a lookup table including:
   the utterance place,
   a peripheral device associated with the utterance place,
   an arrival time between a time when the user device receives the utterance and a time when the electronic device receives the first data, and
   a strength of a signal including the first data based on the utterance place.

4. The electronic device of claim 3, wherein, based on receiving, from the user device, the command included in second data including the reception time information indicating the time of the reception of the utterance from the user and the command obtained by converting the utterance to the data in a character form, the at least one processor is further configured to obtain the arrival time from the time when the user device receives the utterance to the time when the electronic device receives the second data.

5. The electronic device of claim 4, wherein the first data and the second data are generated by which the user device:
   recognizes the utterance of the user based on a voice recognition algorithm, and
   converts the recognized utterance to the data of the character form.

6. The electronic device of claim 4, wherein, if the second data further includes the location information of the user device at the point in time to receive the utterance, the at least one processor is further configured to:
   change the second data to the first data, and
   update the lookup table including the utterance place, the peripheral device associated with the utterance place, the arrival time from the time when the user device receives the utterance to the time when the electronic device receives the first data, and the strength of the signal including the first data based on the utterance place.

7. The electronic device of claim 4, wherein the at least one processor is further configured to select the utterance place candidate where the second data are generated, based on the arrival time from the time when the user device receives the utterance to the time when the electronic device receives the second data and the lookup table.

8. The electronic device of claim 3, wherein the user device is configured to:
   recognize voice of the user,
   convert the recognized voice to the data of the character form, and
   obtain the location information of the user device at the point in time to receive the utterance based on a phrase included in the converted character data.

9. The electronic device of claim 1,
   wherein the electronic device functions as a master hub, and
   wherein the at least one or more other electronic device functions as at least one of a slave hub or the user device.

10. A method for controlling an electronic device, the method comprising:

receiving command for controlling at least one peripheral device based on a utterance from a user device;

receiving, from other electronic device, utterance place candidate groups, wherein each of the utterance candidate groups includes at least one candidate utterance place selected by one of the other electronic devices based on the command;

determining a most frequent place among the received utterance place candidate groups as an utterance place; and transmitting, to at least one peripheral device associated with the determined utterance place, the command.

11. The method of claim 10, further comprising:

when two or more most frequent utterance places are existing in the utterance place candidate groups, transmitting a list of the plurality of utterance places to the user device and selecting the utterance place among the two or more most frequent utterance places based on a signal received from the user device.

12. The method of claim 10, further comprising:

based on receiving, from the user device, first data including reception time information indicating a time of reception of the utterance from a user, second data obtained by converting the utterance to the second data in a character form, and location information of the user device at a time of the reception of the utterance, generating a lookup table including:
the utterance place,
a peripheral device associated with the utterance place,
an arrival time from the time when the user device receives the utterance and a time when the electronic device receives the first data, and
a strength of a signal including the first data based on the utterance place.

13. The method of claim 12, further comprising:

based on receiving, from the user device, the second data, obtaining the arrival time from the time when the user device receives the utterance to the time when the electronic device receives the second data.

14. The method of claim 13, wherein the first data and the second data are generated by which the user device recognizes the utterance of the user based on a voice recognition algorithm and converts the recognized utterance to the second data in the character form.

15. The method of claim 13, further comprising:

if the second data further includes the location information of the user device at the time of reception of the utterance,
changing the second data to the first data; and
updating the lookup table including the utterance place, the peripheral device associated with the utterance place, the arrival time from the time when the user device receives the utterance to the time when the electronic device receives the first data, and the strength of the signal including the first data based on the utterance place.

16. The method of claim 13, further comprising:

selecting the utterance place candidate where the second data are generated, based on the arrival time from the time when the user device receives the utterance to the time when the electronic device receives the second data and the lookup table.

17. The method of claim 10, wherein the electronic device functions as a master hub, and
wherein the other electronic device functions as at least one of a slave hub or the user device.

18. A non-transitory computer-readable storage medium storing instructions that, when executed, cause at least one processor to perform a method, the method comprising:

receiving command for controlling at least one peripheral device based on a utterance from a user device;

receiving, from other electronic device, utterance place candidate groups, wherein each of the utterance candidate groups includes at least one candidate utterance place selected by one of the other electronic devices based on the command;

determining a most frequent place among the received utterance place candidate groups as an utterance place; and transmitting, to at least one peripheral device associated with the determine utterance place, the command.

* * * * *